(12) United States Patent
Sun et al.

(10) Patent No.: US 10,805,158 B2
(45) Date of Patent: Oct. 13, 2020

(54) RADIO RESOURCE MANAGEMENT INFORMATION MEASUREMENT METHOD AND APPARATUS, AND DEVICE

(71) Applicant: Huawei Technologies Co., Ltd., Shenzhen (CN)

(72) Inventors: Jingyuan Sun, Shenzhen (CN); Lixia Xue, Beijing (CN); David Jean-Marie Mazzarese, Beijing (CN); Xiaotao Ren, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 14/866,104

(22) Filed: Sep. 25, 2015

(65) Prior Publication Data

US 2016/0013984 A1    Jan. 14, 2016

Related U.S. Application Data

(63) Continuation of application No. PCT/CN2013/073273, filed on Mar. 27, 2013.

(51) Int. Cl.
*H04L 12/24*    (2006.01)
*H04W 24/08*    (2009.01)
(Continued)

(52) U.S. Cl.
CPC ......... *H04L 41/0866* (2013.01); *H04W 24/08* (2013.01); *H04W 24/10* (2013.01); *H04W 88/08* (2013.01)

(58) Field of Classification Search
None
See application file for complete search history.

(56) References Cited

U.S. PATENT DOCUMENTS

2013/0303220 A1* 11/2013 Acharya ............... H04B 7/024
455/509
2014/0198676 A1* 7/2014 Han ....................... H04W 24/10
370/252
(Continued)

FOREIGN PATENT DOCUMENTS

CN        101686513 A    3/2010
CN        101959171 A    1/2011
(Continued)

OTHER PUBLICATIONS

Ericsson et al., "Measurement Framework Based on CSI-RS", 3GPP TSG-RAN WG2 #78, R2-122529, May 21-25, 2012, 4 pages, Prague, Czech Republic.
(Continued)

*Primary Examiner* — Jeffrey M Rutkowski
*Assistant Examiner* — Mehedi S Aley
(74) *Attorney, Agent, or Firm* — Slater Matsil, LLP

(57) ABSTRACT

Embodiments of the present invention provide a radio resource management (RRM) information measurement method and apparatus, and a device. The method includes determining at least one piece of configuration information used, by user equipment, for radio RRM measurement, where the configuration information includes at least one type of signal type information used for the RRM measurement, and signal combination information used for the RRM measurement, and sending the configuration information to the user equipment, so that the user equipment performs the RRM measurement according to the configuration information.

28 Claims, 8 Drawing Sheets

(51) Int. Cl.
*H04W 24/10* (2009.01)
*H04W 88/08* (2009.01)

(56) References Cited

U.S. PATENT DOCUMENTS

| | | | | |
|---|---|---|---|---|
| 2014/0293953 A1* | 10/2014 | Seo | ........................ | H04W 24/10 370/329 |
| 2014/0334333 A1* | 11/2014 | Xu | ........................ | H04B 7/024 370/252 |
| 2015/0009898 A1* | 1/2015 | Rosa | ........................ | H04L 5/0048 370/328 |
| 2015/0271694 A1* | 9/2015 | Jung | ........................ | H04W 24/10 370/328 |

FOREIGN PATENT DOCUMENTS

| | | | |
|---|---|---|---|
| CN | 102448088 A | | 5/2012 |
| CN | 102685795 A | * | 9/2012 |
| CN | 102685795 A | | 9/2012 |
| WO | 2012115366 A1 | | 8/2012 |

OTHER PUBLICATIONS

Intel Corporation, "CSI-RS Based RRM Measurement for DL CoMP", 3GPP TSG-RAN WG2 #78, R2-122832, May 21-25, 2012, 6 pages, Prague, Czech Republic.

\* cited by examiner

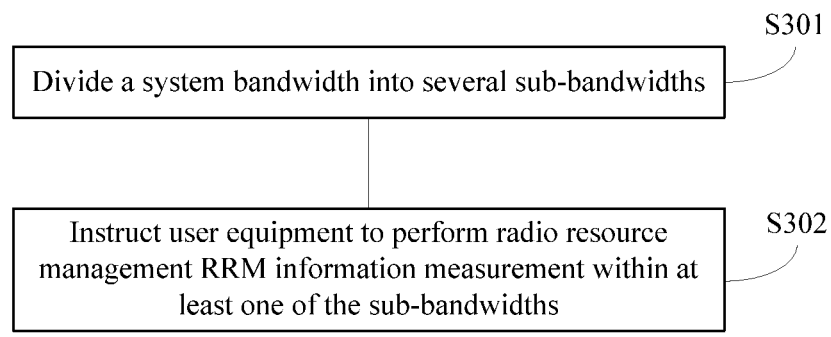
FIG. 3-a
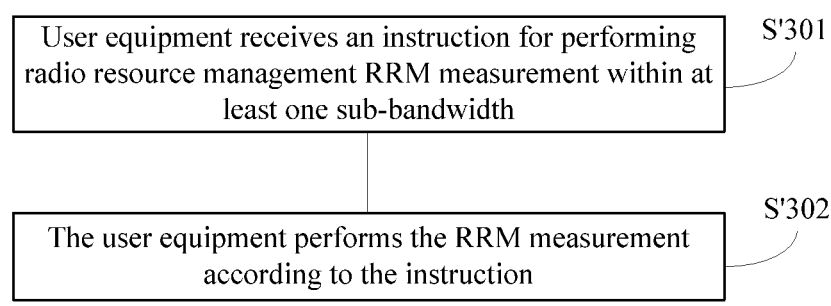
FIG. 3-b
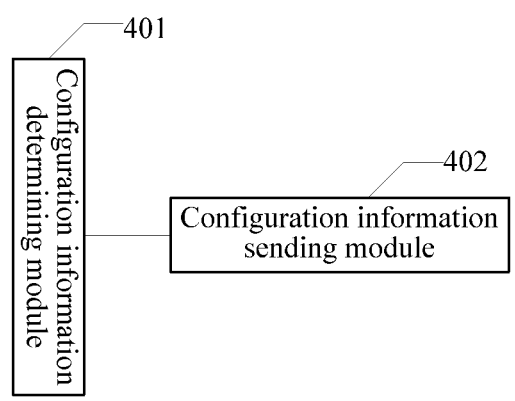
FIG. 4

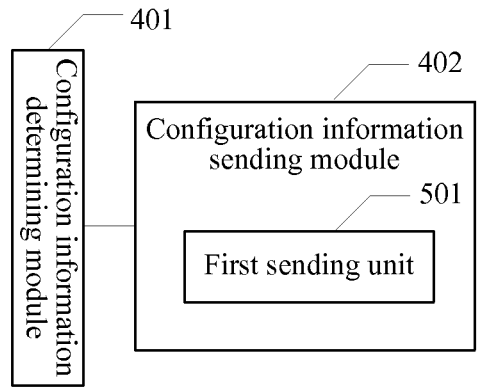
FIG. 5
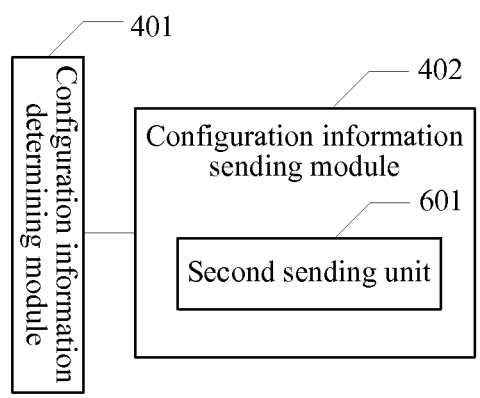
FIG. 6
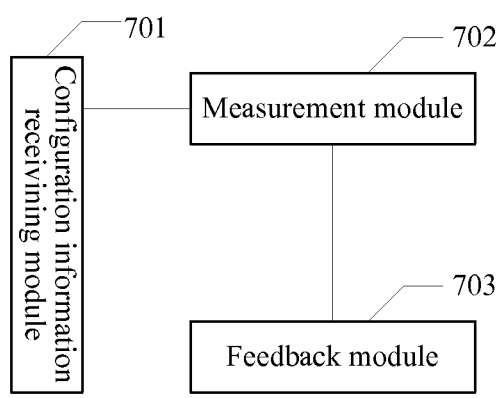
FIG. 7-a

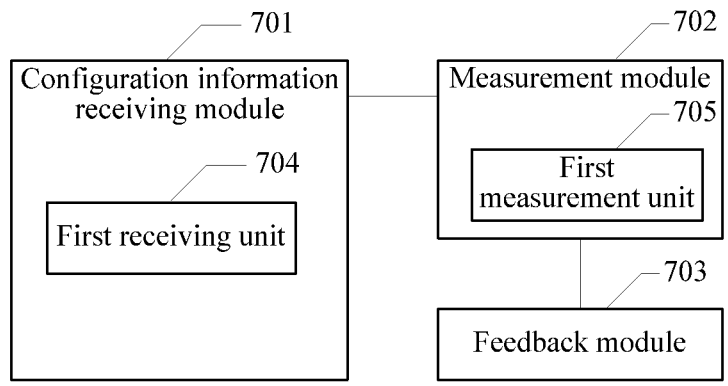
FIG. 7-b
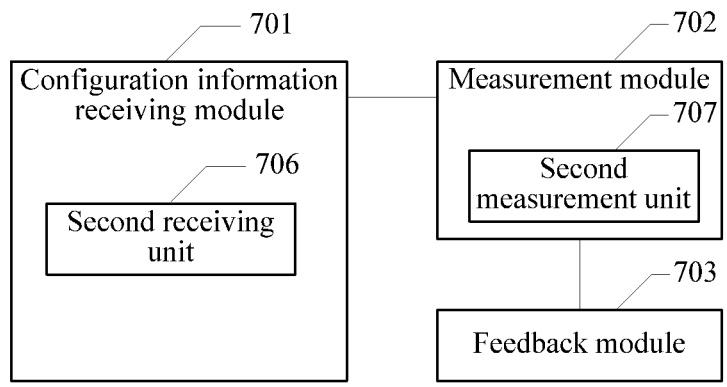
FIG. 7-c
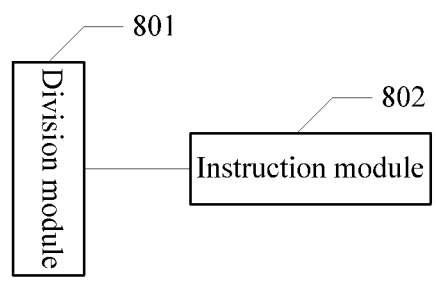
FIG. 8

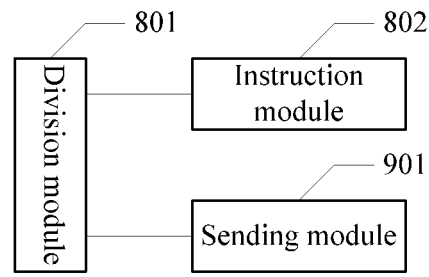
FIG. 9
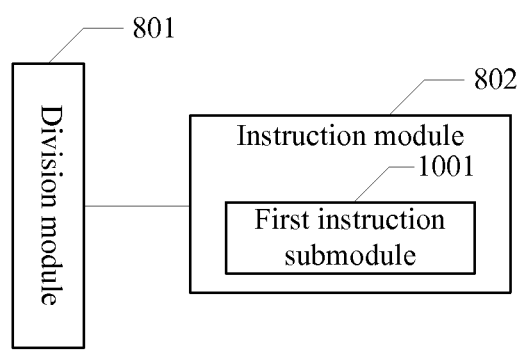
FIG. 10-a
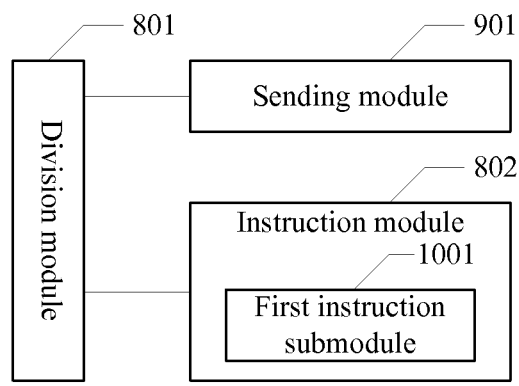
FIG. 10-b

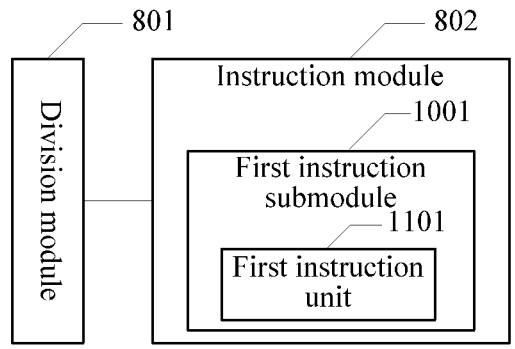
FIG. 11-a
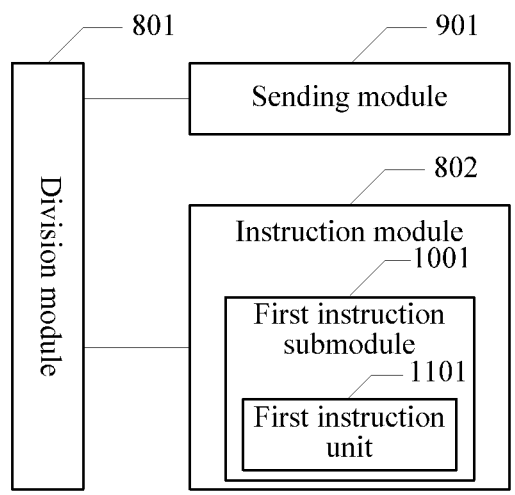
FIG. 11-b
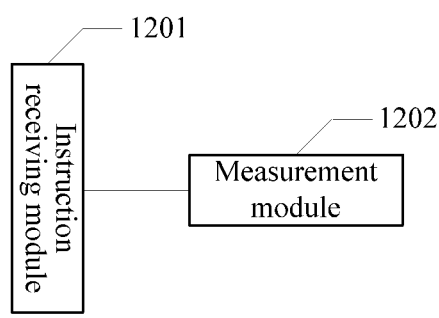
FIG. 12

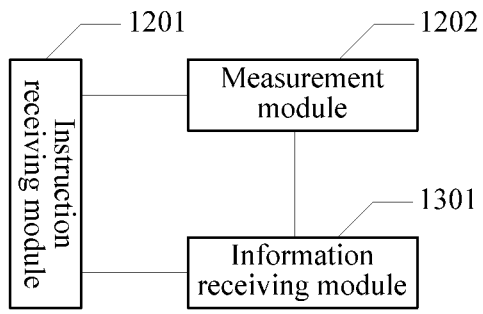
FIG. 13
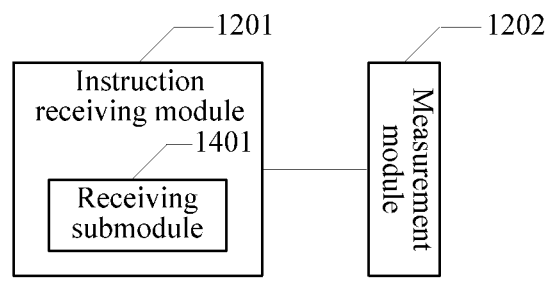
FIG. 14-a
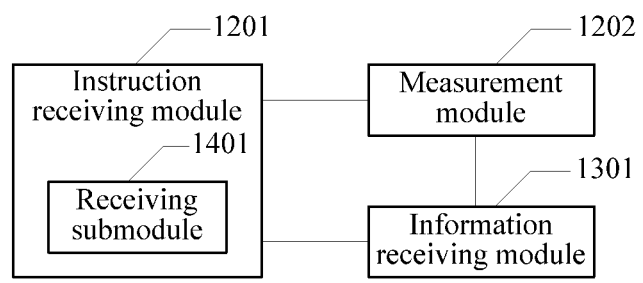
FIG. 14-b

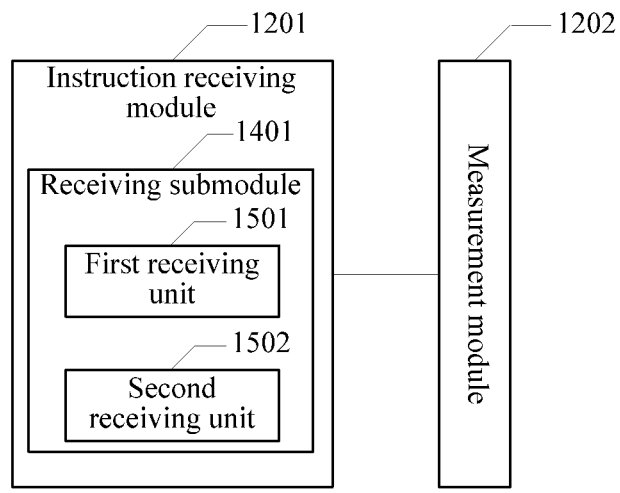
FIG. 15-a
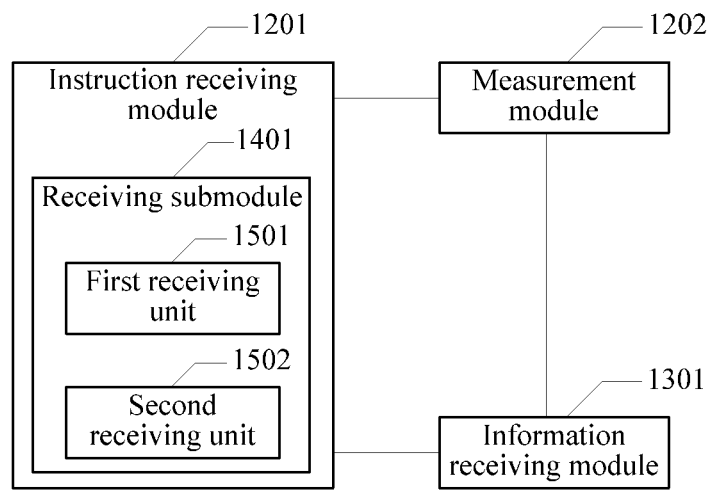
FIG. 15-b

RADIO RESOURCE MANAGEMENT INFORMATION MEASUREMENT METHOD AND APPARATUS, AND DEVICE

This application is a continuation of International Application No. PCT/CN2013/073273, filed on Mar. 27, 2013, which are hereby incorporated by reference in its entirety.

TECHNICAL FIELD

The present invention relates to the field of mobile communications, and in particular, to a radio resource management information measurement method and apparatus, and a device.

BACKGROUND

An evolved universal terrestrial radio access (E-UTRA) system defines radio resource management (RRM) related information, including information such as a reference signal received power (RSRP), reference signal received quality (RSRQ), and a received signal strength indicator (RSSI). The RSRP is defined as a linear average of received powers of corresponding cell-specific reference signals (CRS) on corresponding resource elements (RE) for bearing, within a measurement bandwidth, all CRS ports for measuring the RSRP. The RSRQ is defined as N×RSRP/(E-UTRA carrier RSSI), where N is a quantity of resource bocks (RB) used for measuring an E-UTRA carrier RSSI in an E-UTRA system, and the E-UTRA carrier RSSI is a linear average of total received powers, obtained through measurement on N RBs within a specified measurement bandwidth, in an orthogonal frequency division multiplexing (OFDM) symbol for CRS bearer antenna port 0, and includes co-channel interference of a serving cell, interference generated by a non-serving cell, interference from an adjacent channel, thermal noise, and the like. If higher layer signaling indicates a particular subframe used for measuring RSRQ, an RSSI is measured on all OFDM symbols corresponding to the subframe. In an E-UTRA system, RRM information is generally obtained through measurement, and a basic method is performing multiple times of measurement on the RRM information within a measurement bandwidth and in a time range and then performing linear averaging. For example, for an RSRP, an RSRP measurement value may be obtained by performing five times of RSRP measurement within 200 ms and then performing linear averaging. An RRM measurement value is mainly used for mobility management and the like of user equipment (UE). For example, if an RSRP measurement value represents an average received power of reference signals from a cell to a UE, when the UE moves along a direction leaving cell A, RSRPs, measured by the UE and fed back to a base station, of cell A are gradually decreased, and when the UE moves along a direction approaching cell B, RSRPs, measured by the UE and fed back to the base station, of cell B are gradually increased. In other words, when the UE is moving, continual measurement is performed, and RRM measurement values are fed back to the base station, so that the base station discovers, according to the RRM measurement values fed back by the UE, whether a cell serving the UE needs to be changed.

It can be learned from the foregoing description that, an RRM measurement value and performing measurement on RRM information are both related to a CRS. A CRS is transmitted in each subframe, and CRS density is relatively high in a time or frequency domain, for example, each "RB pair" (namely, a pair of consecutive RBs) has a CRS, where CRS port 0 occupies eight REs on one RB pair, the RB pair herein is a unit of a radio resource, and one RB pair is a radio resource, corresponding to several consecutive subcarriers, on one subframe. In the E-UTRA system, a CRS is generated based on a cell ID, a CRS-related parameter includes a quantity of CRS ports, a CRS frequency offset, a subframe type, and the like; a UE performs RRM information measurement by detecting a CRS of a cell around the UE.

It should be noted that, although an RRM measurement value is related to a CRS, it does not mean that a CRS needs to be sent in all cells, for example, no CRS may be transmitted in a new carrier type (NCT) cell because a CRS may be replaced by a reduced cell-specific reference signal (RCRS) in the NCT cell. Density of an RCRS is lower than that of a CRS in a time domain and/or frequency domain, and therefore accuracy of an RRM information measurement value such as an RSRP may not be ensured. In an NCT cell, in addition to an RCRS, other signals including a primary synchronization signal/secondary synchronization signal PSS/SSS), a discovery reference signal (DRS), a broadcast channel (BCH) and the like may further be sent.

For an NCT cell, an RRM information measurement method provided in the prior art is that a UE performs RRM information measurement based on a DRS. Because DRS-based parameters are related to a cell ID, the method provided in the prior art is that: the UE blindly detects a nearby DRS, and when finding that a DRS matches a DRS related to a cell ID, the UE considers that a DRS is discovered, and then performs RRM information measurement according to the DRS.

A cell around the UE may have a different configurations, for example, a different signal is sent or a sent signal has a different configuration; therefore, in the foregoing RRM information measurement method provided in the prior art, RRM measurement is performed only according to a DRS (or a CRS), which cannot ensure accuracy of RRM measurement for all cells around the UE.

In addition, when performing RRM measurement, the UE performs only one type of RRM statistical measurement according to a system bandwidth, but transmit powers of cells at different locations of the system bandwidth may be different, so that performing only one type of RRM statistical measurement for one cell cannot accurately reflect a change situation, in different frequency bands, of a feature of a large-size channel from the cell to the UE.

SUMMARY

Embodiments of the present invention provide a radio resource management information measurement method and apparatus, and a device, so as to improve accuracy of RRM measurement.

An embodiment of the present invention provides a radio resource management information measurement method, where the method includes: determining at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and sending the configuration information to the user equipment, so that the user equipment performs the RRM measurement according to the configuration information.

Another embodiment of the present invention provides a radio resource management information measurement method, where the method includes: receiving, by user equipment, at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; performing, by the user equipment, the RRM measurement according to the configuration information; and feeding back, by the user equipment, a measurement result of performing the RRM measurement to the base station.

Another embodiment of the present invention provides a radio resource management information measurement method, where the method includes: dividing a system bandwidth into several sub-bandwidths; and instructing user equipment to perform radio resource management RRM measurement within at least one of the sub-bandwidths.

Another embodiment of the present invention provides a radio resource management information measurement method, where the method includes: receiving, by user equipment, an instruction for performing radio resource management RRM measurement within at least one sub-bandwidth, where the sub-bandwidth is obtained by dividing a system bandwidth, and the instruction is sent by a base station to the user equipment; and performing, by the user equipment, the RRM measurement according to the instruction.

An embodiment of the present invention provides a radio resource management measurement apparatus, where the apparatus includes: a configuration information determining module, configured to determine at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and a configuration information sending module, configured to send the configuration information to the user equipment, so that the user equipment performs the RRM measurement according to the configuration information.

Another embodiment of the present invention provides a radio resource management information measurement apparatus, where the apparatus includes: a configuration information receiving module, configured to receive at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; a measurement module, configured to perform the RRM measurement according to the configuration information; and a feedback module, configured to feed back a measurement result of performing the RRM measurement to the base station.

Another embodiment of the present invention provides a radio resource management information measurement apparatus, where the apparatus includes: a division module, configured to divide a system bandwidth into several sub-bandwidths; and an instruction module, configured to instruct user equipment to perform radio resource management RRM information measurement within at least one of the sub-bandwidths.

Another embodiment of the present invention provides a radio resource management information measurement apparatus, where the apparatus includes: an instruction receiving module, configured to receive an instruction for performing radio resource management RRM measurement within at least one sub-bandwidth, where the sub-bandwidth is obtained by dividing a system bandwidth, and the instruction is sent by a base station to the user equipment; and a measurement module, configured to perform the RRM measurement according to the instruction.

Another embodiment of the present invention provides a computer storage medium, where the computer storage medium may store a program; when executed, the program includes the following steps: determining at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and sending the configuration information to the user equipment, so that the user equipment performs the RRM measurement according to the configuration information.

Another embodiment of the present invention provides a computer storage medium, where the computer storage medium may store a program; when executed, the program includes the following steps: dividing a system bandwidth into several sub-bandwidths; and instructing user equipment to perform radio resource management RRM measurement within at least one of the sub-bandwidths.

Another embodiment of the present invention provides a computer storage medium, where the computer storage medium may store a program; when executed, the program includes the following steps: receiving at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; performing the RRM measurement according to the configuration information; and feeding back a measurement result of performing the RRM measurement to the base station.

Another embodiment of the present invention provides a computer storage medium, where the computer storage medium may store a program; when executed, the program includes the following steps: receiving an instruction for performing radio resource management RRM measurement within at least one sub-bandwidth, where the sub-bandwidth is obtained by dividing a system bandwidth, and the instruction is sent by a base station to user equipment; and performing the RRM measurement according to the instruction.

An embodiment of the present invention provides a base station, including: an input apparatus, an output apparatus, a memory, and a processor, where the processor executes the following steps: determining at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and sending the configuration information to the user equipment, so that the user equipment performs the RRM measurement according to the configuration information.

Another embodiment of the present invention provides a base station, including: an input apparatus, an output apparatus, a memory, and a processor, where the processor executes the following steps: dividing a system bandwidth into several sub-bandwidths; and instructing user equipment to perform radio resource management RRM measurement within at least one of the sub-bandwidths.

An embodiment of the present invention provides user equipment, including: an input apparatus, an output apparatus, a memory, and a processor, where the processor executes the following steps: receiving at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; performing the RRM measurement according to the configuration information; and feeding back a measurement result of performing the RRM measurement to the base station.

An embodiment of the present invention provides user equipment, including: an input apparatus, an output apparatus, a memory, and a processor, where the processor executes the following steps: receiving an instruction for performing radio resource management RRM measurement within at least one sub-bandwidth, where the sub-bandwidth is obtained by dividing a system bandwidth, and the instruction is sent by a base station to the user equipment; and performing the RRM measurement according to the instruction.

It can be learned from the foregoing embodiments of the present invention that, at least one piece of configuration information that is used for radio resource management RRM measurement and that is determined by a base station includes at least one type of RRM measurement type information, signal type information used for the RRM measurement, and signal combination information used for the RRM measurement. Therefore, compared with the prior art in which a DRS is blindly detected, the method provided in the embodiments of the present invention has the following advantages: user equipment is enabled to directly perform multiple types of RRM measurement according to configuration information and to process multiple RRM measurement results, without blindly detecting a related configuration of each cell nearby, thereby reducing complexity of user equipment and improving accuracy of RRM measurement and processing.

BRIEF DESCRIPTION OF THE DRAWINGS

To describe the technical solutions in the embodiments of the present invention more clearly, the following briefly introduces the accompanying drawings required for describing the prior art or the embodiments. Apparently, the accompanying drawings in the following description show merely some embodiments of the present invention, and a person skilled in the art may still derive other drawings from these accompanying drawings.

FIG. 3-a is a schematic flowchart of a radio resource management information measurement method according to another embodiment of the present invention;

FIG. 3-b is a schematic flowchart of a radio resource management information measurement method according to another embodiment of the present invention;

FIG. 4 is a schematic structural diagram of a radio resource management measurement apparatus according to an embodiment of the present invention;

FIG. 5 is a schematic structural diagram of a radio resource management measurement apparatus according to another embodiment of the present invention;

FIG. 6 is a schematic structural diagram of a radio resource management measurement apparatus according to another embodiment of the present invention;

FIG. 7-a is a schematic structural diagram of a radio resource management information measurement apparatus according to another embodiment of the present invention;

FIG. 7-b is a schematic structural diagram of a radio resource management information measurement apparatus according to another embodiment of the present invention;

FIG. 7-c is a schematic structural diagram of a radio resource management information measurement apparatus according to another embodiment of the present invention;

FIG. 8 is a schematic structural diagram of a radio resource management information measurement apparatus according to another embodiment of the present invention;

FIG. 9 is a schematic structural diagram of a radio resource management information measurement apparatus according to another embodiment of the present invention;

FIG. 10-a is a schematic structural diagram of a radio resource management information measurement apparatus according to another embodiment of the present invention;

FIG. 10-b is a schematic structural diagram of a radio resource management information measurement apparatus according to another embodiment of the present invention;

FIG. 11-a is a schematic structural diagram of a radio resource management information measurement apparatus according to another embodiment of the present invention;

FIG. 11-*b* is a schematic structural diagram of a radio resource management information measurement apparatus according to another embodiment of the present invention;

FIG. 12 is a schematic structural diagram of a radio resource management information measurement apparatus according to another embodiment of the present invention;

FIG. 13 is a schematic structural diagram of a radio resource management information measurement apparatus according to another embodiment of the present invention;

FIG. 14-*a* is a schematic structural diagram of a radio resource management information measurement apparatus according to another embodiment of the present invention;

FIG. 14-*b* is a schematic structural diagram of a radio resource management information measurement apparatus according to another embodiment of the present invention;

FIG. 15-*a* is a schematic structural diagram of a radio resource management information measurement apparatus according to another embodiment of the present invention; and FIG. 15-*b* is a schematic structural diagram of a radio resource management information measurement apparatus according to another embodiment of the present invention.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention shall fall within the protection scope of the present invention.

Figure 1:
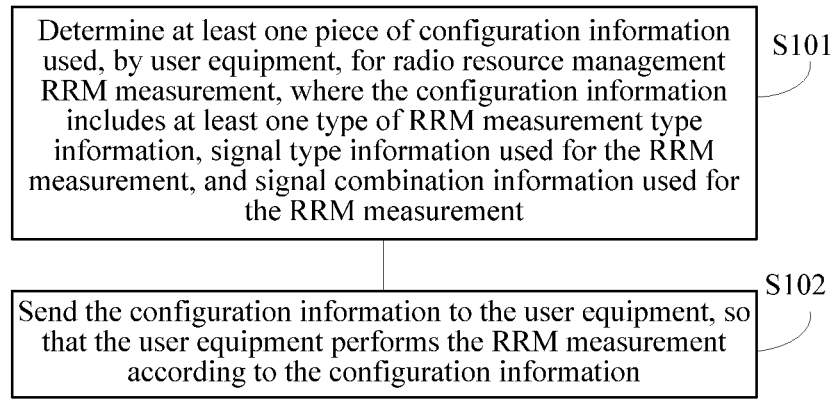
FIG. 1 is a schematic flowchart of a radio resource management information measurement method according to an embodiment of the present invention.

Referring to FIG. 1, FIG. 1 is a schematic flowchart of a radio resource management measurement method according to an embodiment of the present invention. The method may be executed by a base station. The method shown in FIG. 1 mainly includes step S101 and step S102, and is described in detail as follows:

S101: Determine at least one piece of configuration information used, by user equipment, for radio resource management RRM measurement, where the configuration information includes at least one type of RRM measurement type information, signal type information used for the RRM measurement, and signal combination information used for the RRM measurement.

In this embodiment of the present invention, the RRM measurement may be at least one type of reference signal received power (RSRP) measurement, received signal strength indicator (RSSI) measurement, and reference signal received quality (RSRQ) measurement. The configuration information is a collective term of the RRM measurement type information, the signal type information used for the RRM measurement, the signal combination information used for the RRM measurement, and the like, but is not limited to these pieces of configuration information. In addition, in the foregoing at least one piece of configuration information used for the RRM measurement is used for RRM measurement for different cells or different types of RRM measurement and may be independently configured, that is, for different types of RRM measurement, base stations are not associated with one another when configuring corresponding configuration information. For example, five different types of RRM are measured. When RRM measurement type information is configured for each type of RRM measurement, all pieces of RRM measurement type information may be different, or when signal type information used for RRM measurement is configured for each type of RRM measurement, all pieces of signal type information used for the RRM measurement may be different, or when signal combination information used for RRM measurement is configured for each type of RRM measurement, all pieces of signal combination information used for the RRM measurement may be different. For another example, as an embodiment in which configuration information used for RRM measurement is independently configured, a signal used for corresponding measurement may also be separately configured for each measurement item. For example, if signals used for measuring an RSRP and an RSSI of a same new carrier type (NCT) cell are different, to-be-used signals are separately configured, for example, an RCRS is used for measuring the RSRP, and an IMR or a CSI-RS is used for measuring the RSSI. For still another example, multiple cells or nodes around a UE may have different configurations, for example, carrier types are different or sent signals or signal combinations are different. For example, not all of the cells or nodes send a same type of signal or signal combination that may be used for RRM measurement; in this case, at least one piece of configuration information used for related RRM measurement of the cells or nodes is independently configured, and configuration may be separately performed in terms of a configuration of each cell or node, thereby ensuring accuracy of RRM measurement performed by the UE for each cell or node.

It should be noted that, when the base station configures these pieces of configuration information, the configuration information may include only one or two types of the RRM measurement type information, the signal type information used for the RRM measurement, and the signal combination information used for the RRM measurement. When receiving the foregoing one or two types of configuration information, the user equipment may learn or determine the remaining one or two types of configuration information according to a predefined association relationship. For example, if the configuration information includes only the RRM measurement type information, when receiving the RRM measurement type information, the user equipment may learn or determine, according to the predefined association relationship, the signal type information used for the RRM measurement and the signal combination information used for the RRM measurement. In an embodiment of the present invention, the RRM measurement type information includes any one type of or a combination of any several types of carrier type information, the signal type information, the signal combination information, and measurement item information that are used for instructing the user equipment to perform the RRM measurement; in another embodiment of the present invention, the RRM measurement type information includes any one type of or a combination of any several types of a carrier type, the signal combination information, measurement item information, time domain parameter information, frequency domain parameter information, and measurement value adjustment parameter information that are used for instructing the user equipment to perform the RRM measurement, or includes any one type of or a combination of any several types of a carrier type, the signal type information, measurement item information, time domain parameter information, frequency domain parameter information, and measurement value adjustment parameter information that are used for instructing the user equipment to perform the RRM measurement; in still another embodiment of the present invention, a signal type in the signal type information includes one of a cell-specific reference signal (CRS), a reduced cell-specific reference signal (RCRS), a primary synchronization signal (PSS), a secondary synchronization signal (SSS), a discovery reference signal (DRS), a broadcast channel (BCH) signal, an interference measurement resource IMR), and a channel state information-reference signal (CSI-RS), and a signal combination in the signal combination information includes any combination formed by the cell-specific reference signal CRS, the reduced cell-specific reference signal RCRS, the primary synchronization signal PSS, the secondary synchronization signal SSS, the discovery reference signal DRS, the broadcast channel BCH signal, the interference measurement resource IMR, and the channel state information-reference signal CSI-RS. In the foregoing embodiment, the signal type information is used to indicate a type of a signal that needs to be used when the user equipment performs the RRM measurement, or a type of a signal and configuration information of the signal, the signal combination information is used to indicate a type of a group of signals that need to be used when the user equipment performs the RRM measurement and configuration information of the signals, and the carrier type information may be a normal carrier type (NCT), a legacy carrier type (LCT), new carrier type 1 (NCT1), new carrier type 2 (NCT2), or the like. Optionally, the carrier type information may be corresponding to a predefined or default RRM measurement manner that is in the case of the carrier type information. For example, when the carrier type information is an LCT, the RRM measurement is performed based on the CRS, when the carrier type information is NCT1, the RRM measurement is performed based on the RCRS, and when the carrier type information is NCT2, the RRM measurement is performed based on the cell-specific CSI-RS. The measurement item information may specifically be performing which type of RRM measurement, including performing measurement on one or several of an RSRP, RSRQ, and an RSSI, for example, only the RSRP is measured, only the RSRP and the RSSI are measured, or the RSRP, the RSRQ, and the RSSI are all measured. Alternatively, the measurement item information may specifically refer to performing which type of RRM measurement on which type of signal, for example, performing reference signal received power RSRP measurement on the CRS and performing received signal strength indicator RSSI measurement on the CSI-RS, or refer to performing received signal strength indicator RSSI measurement on a signal sent in a cell corresponding to the RRM measurement and performing reference signal received power RSRP measurement on a signal of another cell synchronized with the cell corresponding to the RRM measurement, for example, performing the RRM measurement on an NCT cell, performing received signal strength indicator RSSI measurement on a CRS sent in the NCT cell, performing reference signal received power RSRP measurement on a CRS sent in an LCT cell synchronized with the NCT cell, and then calculating RSRQ by using an RSSI and an RSRP that are obtained through measurement.

As an embodiment of the present invention, when the base station configures the RRM measurement type information, the RRM measurement type information may include only one type or several types of the foregoing information. When receiving one type or several types of the foregoing configuration information, the user equipment may learn or determine remaining configuration information according to a predefined association relationship. For example, if the RRM measurement type information includes only the carrier type information, when receiving the RRM measurement type information, the user equipment may learn or determine, according to the predefined association relationship, any one type of or a combination of any several types of the signal type information or the signal combination information, the measurement item information, the time domain parameter information, the frequency domain parameter information, and the measurement value adjustment parameter information that are used for the RRM measurement. As another embodiment of the present invention, these pieces of configuration information may be configured by a serving cell of the UE.

As an embodiment of the present invention, these pieces of configuration information may be notified by means of broadcast signaling or dedicated signaling. For example, notification is performed for multiple UEs by means of broadcast RRC signaling, or notification is performed for one UE by means of dedicated RRC signaling.

As described in the foregoing, the signal type information may be used to indicate a type of a signal that needs to be used when the user equipment performs the RRM measurement and configuration information of the signal, and the signal combination information is used to indicate a type of a group of signals that need to be used when the user equipment performs the RRM measurement and configuration information of the signals. Specifically, for the RCRS, configuration information of the RCRS includes at least one of: whether the RCRS shifts, a shifting parameter, and time domain location information of the RCRS. For the CSI-RS, configuration information of the CSI-RS includes at least one of pattern information, time domain location information, and a scrambling code ID of the CSI-RS. For the PSS or the SSS, configuration information of the PSS or the SSS includes at least one of: whether there is the PSS or the SSS, frequency domain location information, and time domain location information. For the DRS, configuration information of the DRS includes at least one type of frequency domain location information and time domain location information, or at least one type of frequency domain location information and time domain location information and corresponding sequence initialization ID information. For a common control channel (for example, PBCH/ePBCH), configuration information of the common control channel includes scrambling code ID information of the common control channel, or may further include at least one type of frequency domain location information and time domain location information. For example, when instructing user equipment to use a PSS/SSS to perform RRM measurement for a cell, a base station simultaneously notifies the user equipment of at least one type of frequency domain location information and time domain location information of the PSS/SSS; when instructing user equipment to use a PSS/SSS to perform one type of RRM measurement, a base station simultaneously notifies the user equipment of corresponding sequence initialization ID information and at least one type of frequency domain location information and time domain location information of the PSS/SSS; when instructing user equipment to use a DRS to perform RRM measurement for a cell, a base station simultaneously notifies the user equipment of at least one type of frequency domain location information and time domain location information of the DRS; when instructing user equipment to use a DRS to perform one type of RRM measurement, a base station simultaneously notifies the user equipment of corresponding sequence initialization ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; when instructing user equipment to use a PSS/SSS and a CRS to perform RRM measurement for a cell, a base station simultaneously notifies the user equipment of at least one type of frequency domain location information and time domain location information of the PSS/SSS; when instructing user equipment to use a DRS to perform RRM measurement for a cell or to perform one type of RRM measurement, a base station simultaneously notifies the user equipment of scrambling code ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; or when instructing user equipment to use an IMR or a ZP CSI-RS to perform RRM measurement for a cell or to perform one type of RRM measurement, a base station simultaneously notifies the user equipment of at least one type of frequency domain location information and time domain location information of the IMR or the ZP CSI-RS.

S102: Send the configuration information to the user equipment, so that the user equipment performs the RRM measurement according to the configuration information.

For the foregoing embodiment in which the configuration information includes the signal type information used for the RRM measurement, the base station may, during configuration, configure that the user equipment uses different types of signals to perform measurement for different types of RRM measurement, or configure, for multiple types of RRM measurement, that the user equipment uses one type of signal to perform RRM measurement for some types of RRM measurement, and uses a signal combination to perform RRM measurement for the other types of RRM measurement, where signals or signal combinations corresponding to the multiple types of RRM measurement may be different.

Specifically, when notifying the configuration information, the base station may notify, in terms of configuration information of each type of RRM measurement, a cell list or an RRM measurement list for the RRM measurement performed according to the configuration information; or the base station separately notifies, for each type of RRM measurement or RRM measurement for each cell, the UE of configuration information of corresponding RRM measurement. After performing the RRM measurement according to the configuration information delivered by the base station, the user equipment feeds back a measurement result to the base station that delivers the configuration information.

It can be learned from the foregoing radio resource management measurement method provided in this embodiment of the present invention that, at least one piece of configuration information that is used for radio resource management RRM measurement and that is determined by a base station includes at least one type of RRM measurement type information, signal type information used for the RRM measurement, and signal combination information used for the RRM measurement. Therefore, compared with the prior art in which a DRS is blindly detected, the method provided in this embodiment of the present invention has the following advantages: user equipment is enabled to directly perform multiple types of RRM measurement according to configuration information and to process multiple RRM measurement results, without blindly detecting a related configuration of each cell nearby, thereby reducing complexity of user equipment and improving accuracy of RRM measurement and processing; in addition, a base station may send different configuration information to the UE for RRM measurement for different cells or different types of RRM measurement, so that it can be ensured that the UE performs RRM measurement in terms of a feature of a signal sent in a corresponding cell or at a corresponding transmission point, instead of performing all types of RRM measurement according to only one type of signal, thereby improving accuracy of radio resource management RRM measurement and processing.

In this embodiment in which the RRM measurement type information includes any one type of or a combination of any several types of a carrier type, the signal type information or the signal combination information, measurement item information, time domain parameter information, frequency domain parameter information, and measurement value adjustment parameter information that are used for instructing the user equipment to perform the RRM measurement, when the RRM measurement type information includes a measurement value adjustment parameter used by the user equipment for the RRM measurement, as an embodiment of the present invention, the measurement value adjustment parameter for the RRM includes weight values of measurement values that are obtained from at least two types of signals in the signal combination information when the user equipment is instructed to use the at least two types of signals to measure a same measurement item, and the weight values are used by the user equipment to perform statistical averaging on the measurement values of the measurement item according to the weight values, so as to obtain a measurement result of the measurement item. For example, statistical averaging is performed on RSRP values obtained through measurement on an RCRS and a PSS/SSS, a weight value of the RSRP value obtained through measurement on the RCRS is 30%, a weight value of the RSRP value obtained through measurement on the PSS/SSS is 70%, and the statistical averaging is performed according to weighted values to obtain the measurement result of an RSRP. When the RRM measurement type information includes a measurement value adjustment parameter used by the user equipment for the RRM measurement, as another embodiment of the present invention, the measurement value adjustment parameter includes weight values of measurement values that are obtained from at least two types of signals in the signal combination type when the user equipment uses the at least two types of signals to measure a same measurement item, and first adjustment values of the measurement values that are obtained from the at least two types of signals in the signal combination type when the user equipment uses the at least two types of signals to measure the same measurement item, and the weight values and the first adjustment values are used by the user equipment to adjust the measurement values according to the first adjustment values and then to perform statistical averaging on adjusted measurement values according to the weight values, so as to obtain a measurement result of the measurement item. For example, when statistical averaging is performed on RSRP values obtained through measurement on an RCRS and a PSS/SSS, if the RSRP value obtained through the measurement on the RCRS is M dB, an adjustment value is 1 dB, the RSRP value obtained through the measurement on the PSS/SSS is N dB, and an adjustment value is 0 dB, an RSRP, on the RCRS, obtained after adjustment is (M+1) dB, an RSRP, on the PSS/SSS, obtained after adjustment is (N−0) dB, and then statistical averaging or feedback is performed. When the RRM measurement type information includes a measurement value adjustment parameter used by the user equipment for the RRM measurement, as still another embodiment of the present invention, the measurement value adjustment parameter includes second adjustment values of measurement values that are obtained from at least two types of signals when the user equipment uses the at least two types of signals to measure a same measurement item, and the second adjustment values are used for instructing the user equipment to: when the measurement values are compared with a threshold of the measurement item or compared with another measurement value, adjust the measurement values according to the second adjustment values and then compare adjusted measurement values with the threshold of the measurement item or with the another measurement value. When the RRM measurement type information includes a measurement value adjustment parameter used by the user equipment for the RRM measurement, as still another embodiment of the present invention, when the RRM measurement type information includes the measurement value adjustment parameter used for instructing the user equipment to perform the RRM measurement, the measurement value adjustment parameter includes third adjustment values of measurement values that are obtained from at least two types of signals when the user equipment uses the at least two types of signals to measure a same measurement item, where the third adjustment values are used by the user equipment to adjust the measurement values according to the third adjustment values and then to calculate another measurement item by using adjusted measurement values.

In this embodiment of the present invention, a base station may configure different RRM measurement value adjustment parameters according to RRM measurement for different cells or different types of RRM measurement that need to be performed by a UE, so that different measurement value adjustment parameters may be set for the different types of RRM measurement according to correspondingly used signals or signal types or parameters of the signals, instead of using a same measurement value adjustment parameter for RRM measurement for all cells or all types of RRM measurement, thereby ensuring accuracy of adjustment on RRM measurement performed by the UE for a cell or node.

In the foregoing embodiment of the present invention, an information item included in the RRM measurement type information, the signal type information, or the signal combination information has a corresponding index number. As an embodiment in which the configuration information is sent to the user equipment, so that the user equipment measures RRM according to the configuration information, the foregoing index number corresponding to the RRM measurement type information, the signal type information, or the signal combination information may be sent to the user equipment, so that the user equipment searches a correspondence table according to the index number to: acquire the RRM measurement type information, the signal type information, or the signal combination information corresponding to the index number, and then measure the RRM. In the foregoing embodiment, the correspondence table may be predefined, and the correspondence table includes a correspondence between the index number and the RRM measurement type information or a correspondence between the index number and the signal combination information. As another embodiment in which the configuration information is sent to the user equipment, so that the user equipment measures RRM according to the configuration information, a correspondence table and the index number may be sent to the user equipment, so that the user equipment searches the correspondence table according to the index number to: acquire the RRM measurement type information, the signal type information, or the signal combination information corresponding to the index number, and then measure the RRM. In this embodiment of the present invention, the RRM measurement type information, the signal type information, or the signal combination information is not directly sent to the user equipment, but a corresponding index number is sent, so that signaling is reduced, and signaling design complexity is reduced.

Figure 2:
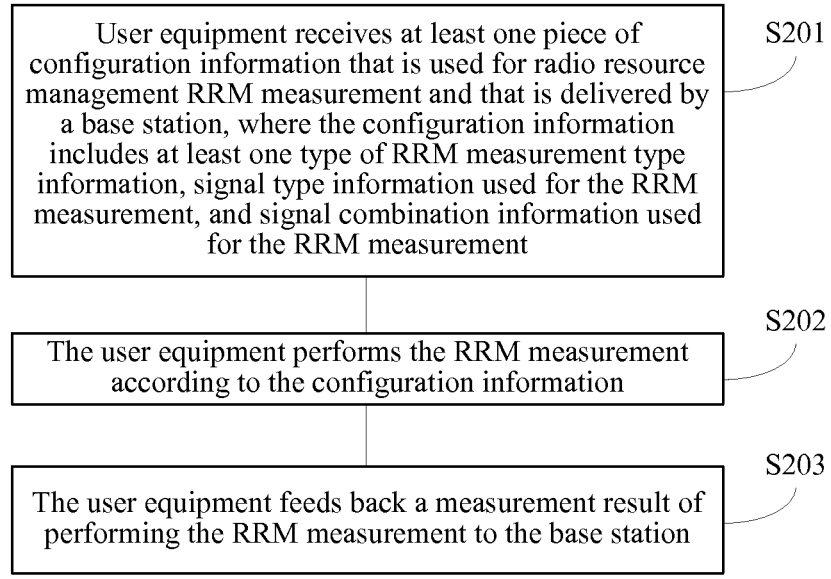
FIG. 2 is a schematic flowchart of a radio resource management information measurement method according to an embodiment of the present invention.

Corresponding to the radio resource management information measurement method shown in FIG. 1, an embodiment of the present invention further provides a radio resource management information measurement method. Referring to FIG. 2, the method mainly includes step S201 to step S203, and is described in detail in the following steps.

S201: User equipment receives at least one piece of configuration information that is used for radio resource management RRM measurement and that is delivered by a base station, where the configuration information includes at least one type of RRM measurement type information, signal type information used for the RRM measurement, and signal combination information used for the RRM measurement.

As described in the foregoing, the RRM measurement may be at least one type of RSRP measurement, RSSI measurement, and RSRQ measurement. The configuration information is configured by the base station and delivered to the user equipment, and the configuration information is a collective term of the RRM measurement type information, the signal type information used for the RRM measurement, the signal combination information used for the RRM measurement, and the like, but is not limited to these pieces of configuration information. In addition, the foregoing at least one piece of configuration information used for the RRM measurement is used for RRM measurement for different cells or different types of RRM measurement and may be independently configured, that is, for different types of RRM measurement, base stations are not associated with one another when configuring corresponding configuration information. For example, five different types of RRM are measured. When RRM measurement type information is configured for each type of RRM measurement, all pieces of RRM measurement type information may be different, or when signal type information used for RRM measurement is configured for each type of RRM measurement, all pieces of signal type information used for the RRM measurement may be different, or when signal combination information used for RRM measurement is configured for each type of RRM measurement, all pieces of signal combination information used for the RRM measurement may be different. For another example, as an embodiment in which configuration information used for RRM measurement is independently configured, a signal used for corresponding measurement may also be separately configured for each measurement item. For example, if signals used for measuring an RSRP and an RSSI of a same new carrier type NCT cell are different, to-be-used signals are separately configured, for example, an RCRS is used for measuring the RSRP, and an IMR or a CSI-RS is used for measuring the RSSI. For still another example, multiple cells or nodes around a UE may have different configurations, for example, carrier types are different or sent signals or signal combinations are different. For example, not all of the cells or nodes send a same type of signal or signal combination that may be used for RRM measurement; in this case, at least one piece of configuration information used for related RRM measurement of the cells or nodes is independently configured, and configuration may be separately performed in terms of a configuration of each cell or node, thereby ensuring accuracy of RRM measurement performed by the UE for each cell or node.

It should be noted that, when the base station configures these pieces of configuration information, the configuration information may include only one or two types of the RRM measurement type information, the signal type information used for the RRM measurement, and the signal combination information used for the RRM measurement. When receiving the foregoing one or two types of configuration information, the user equipment may learn or determine remaining one or two types of configuration information according to a predefined association relationship. For example, if the configuration information includes only the RRM measurement type information, when receiving the RRM measurement type information, the user equipment may learn or determine, according to the predefined association relationship, the signal type information used for the RRM measurement and the signal combination information used for the RRM measurement. In an embodiment of the present invention, the RRM measurement type information includes any one type of or a combination of any several types of carrier type information, the signal type information, the signal combination information, and measurement item information that are used for instructing the user equipment to perform the RRM measurement; in another embodiment of the present invention, the RRM measurement type information includes any one type of or a combination of any several types of a carrier type, the signal combination information, measurement item information, time domain parameter information, frequency domain parameter information, and measurement value adjustment parameter information that are used for instructing the user equipment to perform the RRM measurement, or includes any one type of or a combination of any several types of a carrier type, the signal type information, measurement item information, time domain parameter information, frequency domain parameter information, and measurement value adjustment parameter information that are used for instructing the user equipment to perform the RRM measurement; in still another embodiment of the present invention, a signal type in the signal type information includes one of a cell-specific reference signal CRS, a reduced cell-specific reference signal RCRS, a primary synchronization signal PSS, a secondary synchronization signal SSS, a discovery reference signal DRS, a broadcast channel BCH signal, an interference measurement resource IMR, and a channel state information-reference signal CSI-RS, and a signal combination in the signal combination information includes any combination formed by the cell-specific reference signal CRS, the reduced cell-specific reference signal RCRS, the primary synchronization signal PSS, the secondary synchronization signal SSS, the discovery reference signal DRS, the broadcast channel BCH signal, the interference measurement resource IMR, and the channel state information-reference signal CSI-RS. In the foregoing embodiment, the signal type information is used to indicate a type of a signal that needs to be used when the user equipment performs the RRM measurement, or a type of a signal and configuration information of the signal, the signal combination information is used to indicate a type of a group of signals that need to be used when the user equipment performs the RRM measurement and configuration information of the signals, and the carrier type information may be a normal carrier type (NCT), a legacy carrier type (LCT), new carrier type 1 (NCT1), new carrier type 2 (NCT2), or the like. Optionally, the carrier type information may be corresponding to a predefined or default RRM measurement manner that is in the case of the carrier type information. For example, when the carrier type information is an LCT, the RRM measurement is performed based on the CRS, when the carrier type information is NCT1, the RRM measurement is performed based on the RCRS, and when the carrier type information is NCT2, the RRM measurement is performed based on the cell-specific CSI-RS. The measurement item information may specifically be performing which type of RRM measurement, including performing measurement on one or several of an RSRP, RSRQ, and an RSSI, for example, only the RSRP is measured, only the RSRP and the RSSI are measured, or the RSRP, the RSRQ, and the RSSI are all measured. Alternatively, the measurement item information may specifically refer to performing which type of RRM measurement on which type of signal, for example, performing reference signal received power RSRP measurement on the CRS and performing received signal strength indicator RSSI measurement on the CSI-RS, or refer to performing received signal strength indicator RSSI measurement on a signal sent in a cell corresponding to the RRM measurement and performing reference signal received power RSRP measurement on a signal of another cell synchronized with the cell corresponding to the RRM measurement, for example, performing the RRM measurement on an NCT cell, performing received signal strength indicator RSSI measurement on a CRS sent in the NCT cell, performing reference signal received power RSRP measurement on a CRS sent in an LCT cell synchronized with the NCT cell, and then calculating RSRQ by using an RSSI and an RSRP that are obtained through measurement.

As an embodiment of the present invention, when the base station configures the RRM measurement type information, the RRM measurement type information may include only one type or several types of the foregoing information. When receiving one type or several types of the foregoing configuration information, the user equipment may learn or determine remaining configuration information according to a predefined association relationship. For example, if the RRM measurement type information includes only the carrier type information, when receiving the RRM measurement type information, the user equipment may learn or determine, according to the predefined association relationship, any one type of or a combination of any several types of the signal type information or the signal combination information, the measurement item information, the time domain parameter information, the frequency domain parameter information, and the measurement value adjustment parameter information that are used for the RRM measurement. As another embodiment of the present invention, these pieces of configuration information may be configured by a serving cell of the UE.

As an embodiment of the present invention, these pieces of configuration information may be notified by means of broadcast signaling or dedicated signaling. For example, notification is performed for multiple UEs by means of broadcast RRC signaling, or notification is performed for one UE by means of dedicated RRC signaling.

As described in the foregoing, the signal type information may be used to indicate a type of a signal that needs to be used when the user equipment performs the RRM measurement and configuration information of the signal, and the signal combination information is used to indicate a type of a group of signals that need to be used when the user equipment performs the RRM measurement and configuration information of the signals. Specifically, for the RCRS, configuration information of the RCRS includes at least one of: whether the RCRS shifts, a shifting parameter, and time domain location information of the RCRS. For the CSI-RS, configuration information of the CSI-RS includes at least one of pattern information, time domain location information, and a scrambling code ID of the CSI-RS. For the PSS or the SSS, configuration information of the PSS or the SSS includes at least one of: whether there is the PSS or the SSS, frequency domain location information, and time domain location information. For the DRS, configuration information of the DRS includes at least one type of frequency domain location information and time domain location information, or corresponding sequence initialization ID information and at least one type of frequency domain location information and time domain location information. For a common control channel (for example, PBCH/ePBCH), configuration information of the common control channel includes scrambling code ID information of the common control channel, or may further include at least one type of frequency domain location information and time domain location information. For example, when instructing user equipment to use a PSS/SSS to perform RRM measurement for a cell, a base station simultaneously notifies the user equipment of at least one type of frequency domain location information and time domain location information of the PSS/SSS; when instructing user equipment to use a PSS/SSS to perform one type of RRM measurement, a base station simultaneously notifies the user equipment of corresponding sequence initialization ID information and at least one type of frequency domain location information and time domain location information of the PSS/SSS; when instructing user equipment to use a DRS to perform RRM measurement for a cell, a base station simultaneously notifies the user equipment of at least one type of frequency domain location information and time domain location information of the DRS; when instructing user equipment to use a DRS to perform one type of RRM measurement, a base station simultaneously notifies the user equipment of corresponding sequence initialization ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; when instructing user equipment to use a PSS/SSS and a CRS to perform RRM measurement for a cell, a base station simultaneously notifies the user equipment of at least one type of frequency domain location information and time domain location information of the PSS/SSS; when instructing user equipment to use a DRS to perform RRM measurement for a cell or to perform one type of RRM measurement, a base station simultaneously notifies the user equipment of scrambling code ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; or when instructing user equipment to use an IMR or a ZP CSI-RS to perform RRM measurement for a cell or to perform one type of RRM measurement, a base station simultaneously notifies the user equipment of at least one type of frequency domain location information and time domain location information of the IMR or the ZP CSI-RS.

Specifically, when the UE receives the configuration information notified by the base station, the configuration information includes one of the following manners: the configuration information is configuration information for each type of RRM measurement, and the configuration information includes a cell list or an RRM measurement list for the RRM measurement performed according to the configuration information; or the configuration information is RRM measurement configuration information corresponding to each type of RRM measurement or RRM measurement for each cell.

It can be learned from the foregoing radio resource management measurement method provided in this embodiment of the present invention that, at least one piece of configuration information that is used for radio resource management RRM measurement, that is delivered by a base station, and that is received by user equipment includes at least one type of RRM measurement type information, signal type information used for the RRM measurement, and signal combination information used for the RRM measurement. Therefore, compared with the prior art in which a DRS is blindly detected, the method provided in this embodiment of the present invention has the following advantages: user equipment is enabled to directly perform multiple types of RRM measurement according to configuration information and to process multiple RRM measurement results, without blindly detecting a related configuration of each cell nearby, thereby reducing complexity of user equipment and improving accuracy of RRM measurement and processing; in addition, the UE receives different configuration information used by the base station for RRM measurement for different cells or different types of RRM measurement, so that it can be ensured that the UE performs RRM measurement in terms of a feature of a signal sent in a corresponding cell or at a corresponding transmission point, instead of performing all types of RRM measurement according to only one type of signal, thereby improving accuracy of radio resource management RRM measurement and processing.

In this embodiment in which the RRM measurement type information includes any one type of or a combination of any several types of a carrier type, the signal type information or the signal combination information, measurement item information, time domain parameter information, frequency domain parameter information, and measurement value adjustment parameter information that are used for instructing the user equipment to perform the RRM measurement, when the RRM measurement type information includes a measurement value adjustment parameter used by the user equipment for the RRM measurement, as an embodiment of the present invention, the measurement value adjustment parameter for the RRM includes weight values of measurement values that are obtained from at least two types of signals in the signal combination information when the user equipment is instructed to use the at least two types of signals to measure a same measurement item, and the weight values are used by the user equipment to perform statistical averaging on the measurement values of the measurement item according to the weight values, so as to obtain a measurement result of the measurement item. For example, statistical averaging is performed on RSRP values obtained through measurement on an RCRS and a PSS/SSS, a weight value of the RSRP value obtained through measurement on the RCRS is 30%, a weight value of the RSRP value obtained through measurement on the PSS/SSS is 70%, and the user equipment performs statistical averaging according to weighted values to obtain the measurement result of an RSRP. When the RRM measurement type information includes a measurement value adjustment parameter used by the user equipment for the RRM measurement, as another embodiment of the present invention, the measurement value adjustment parameter includes weight values of measurement values that are obtained from at least two types of signals in the signal combination type when the user equipment uses the at least two types of signals to measure a same measurement item, and first adjustment values of the measurement values that are obtained from the at least two types of signals in the signal combination type when the user equipment uses the at least two types of signals to measure the same measurement item, and the weight values and the first adjustment values are used by the user equipment to adjust the measurement values according to the first adjustment values and then to perform statistical averaging on adjusted measurement values according to the weight values, so as to obtain a measurement result of the measurement item. For example, when statistical averaging is performed on RSRP values obtained through measurement on an RCRS and a PSS/SSS, if the RSRP value obtained through the measurement on the RCRS is M dB, an adjustment value is 1 dB, the RSRP value obtained through the measurement on the PSS/SSS is N dB, and an adjustment value is 0 dB, an RSRP, on the RCRS, obtained by the user equipment after adjustment is (M+1) dB, an RSRP, on the PSS/SSS, obtained by the user equipment after adjustment is (N–0) dB, and then statistical averaging or feedback is performed. When the RRM measurement type information includes a measurement value adjustment parameter used by the user equipment for the RRM measurement, as still another embodiment of the present invention, the measurement value adjustment parameter includes second adjustment values of measurement values that are obtained from at least two types of signals when the user equipment uses the at least two types of signals to measure a same measurement item, and the second adjustment values are used for instructing the user equipment to: when the measurement values are compared with a threshold of the measurement item or compared with another measurement value, adjust the measurement values according to the second adjustment values and then compare adjusted measurement values with the threshold of the measurement item or with the another measurement value. When the RRM measurement type information includes a measurement value adjustment parameter used by the user equipment for the RRM measurement, as still another embodiment of the present invention, when the RRM measurement type information includes the measurement value adjustment parameter used for instructing the user equipment to perform the RRM measurement, the measurement value adjustment parameter includes third adjustment values of measurement values that are obtained from at least two types of signals when the user equipment uses the at least two types of signals to measure a same measurement item, where the third adjustment values are used by the user equipment to adjust the measurement values according to the third adjustment values and then to calculate another measurement item by using adjusted measurement values. In this embodiment of the present invention, RRM measurement configuration information that is sent by a base station and that is received by a UE may include different RRM measurement value adjustment parameters configured for RRM measurement for different cells or different types of RRM measurement that need to be performed by the UE, so that different measurement value adjustment parameters may be set for the different types of RRM measurement according to correspondingly used signals or signal types or parameters of the signals, instead of using a same measurement value adjustment parameter for RRM measurement for all cells or all types of RRM measurement, thereby ensuring accuracy of adjustment on RRM measurement performed by the UE for a cell or node.

In the foregoing embodiment of the present invention, an information item included in the RRM measurement type information, the signal type information, or the signal combination information has a corresponding index number. As an embodiment in which the user equipment receives at least one piece of configuration information that is used for radio resource management RRM measurement and that is delivered by the base station, the user equipment may receive an index number corresponding to the foregoing RRM measurement type information, the foregoing signal type information, or the foregoing signal combination information sent by the base station; correspondingly, as an embodiment in which the user equipment performs the RRM measurement according to the configuration information, the user equipment may search a correspondence table according to the index number to: acquire the RRM measurement type information, the signal type information, or the signal combination information corresponding to the index number, and then measure the RRM, where the correspondence table includes a correspondence between the index number and the RRM measurement type information, between the index number and the signal type information, or between the index number and the signal combination information. In the foregoing embodiment, the correspondence table may be predefined, and the correspondence table includes a correspondence between the index number and the RRM measurement type information or a correspondence between the index number and the signal combination information. As another embodiment in which the user equipment receives at least one piece of configuration information that is used for radio resource management RRM measurement and that is delivered by the base station, the user equipment may receive a correspondence table sent by the base station and an index number corresponding to the foregoing RRM measurement type information, the foregoing signal type information, or the foregoing signal combination information; correspondingly, as another embodiment in which the user equipment performs the RRM measurement according to the configuration information, the user equipment may search the correspondence table according to the index number to: acquire the RRM measurement type information, the signal type information, or the signal combination information corresponding to the index number, and then measure the RRM. In this embodiment of the present invention, the user equipment does not directly receive the RRM measurement type information, the signal type information, or the signal combination information, but receives only the corresponding index number, so that signaling is reduced, and signaling design complexity is reduced.

S202: The user equipment performs the RRM measurement according to the configuration information.

For this embodiment in which the configuration information includes the signal type information used for the RRM measurement, the base station may, during configuration, configure that the user equipment uses different types of signals to perform measurement for different types of RRM measurement, or configure, for multiple types of RRM measurement, that the user equipment uses one type of signal to perform RRM measurement for some types of RRM measurement, and uses a signal combination to perform RRM measurement for the other types of RRM measurement, where signals or signal combinations corresponding to the multiple types of RRM measurement may be different. Specifically, when notifying the configuration information, the base station may notify, in terms of configuration information of each type of RRM measurement, a cell list or an RRM measurement list for the RRM measurement performed according to the configuration information; or the base station separately notifies, for each type of RRM measurement or RRM measurement for each cell, the UE of configuration information of corresponding RRM measurement. The user equipment performs the RRM measurement according to the configuration information delivered by the base station.

S203: The user equipment feeds back a measurement result of performing the RRM measurement to the base station.

Referring to FIG. 3-*a*, FIG. 3-*a* is a schematic flowchart of a radio resource management information measurement method according to another embodiment of the present invention. The method may be executed by a base station. The method shown in FIG. 3-*a* mainly includes step S301 and step S302, and is described in detail in the steps below.

S301: Divide a system bandwidth into several sub-bandwidths.

The system bandwidth includes a maximum available system bandwidth, a downlink transmission bandwidth, an uplink transmission bandwidth, or a maximum uplink available system bandwidth.

For one type of RRM measurement, RRM measurement is performed within multiple partial bandwidths of the system bandwidth. For example, if the system bandwidth is 10 MHz, the base station may divide the system bandwidth into five sub-bandwidths with a bandwidth of 2 MHz, and separately perform RRM measurement for each sub-bandwidth, or perform RRM measurement for a first sub-bandwidth with a bandwidth of 2 MHz.

S302: Instruct user equipment to perform radio resource management RRM information measurement within at least one of the sub-bandwidths.

Further, the method further includes: sending a size and/or location information within the at least one of the sub-bandwidths to the user equipment.

In this embodiment in which the user equipment is instructed to perform the radio resource management RRM information measurement within the at least one of the sub-bandwidths, the user equipment may be instructed to measure at least one of a reference signal received power RSRP, a received signal strength indicator RSSI, and reference signal received quality RSRQ within the sub-bandwidth. Specifically, the user equipment is instructed to calculate at least one RSRQ according to a broadband RSRP and at least one sub-band RSSI, or the user equipment is instructed to calculate at least one RSRQ according to at least one sub-band RSRP and a broadband RSRP, where at least one of the RSRP and the RSSI is broadband, or both of the RSRP and the RSSI are within partial bandwidths. For example, the user equipment may calculate M RSRQs according to a broadband RSRP and M sub-bandwidth RSSIs, or calculate N RSRQs according to a broadband RSSI and N sub-bandwidth RSRPs, or calculate a maximum of (M×N) RSRQs according to M sub-bandwidth RSSIs and N sub-bandwidth RSRPs. After performing radio resource management RRM information measurement within the at least one sub-bandwidth according to an instruction from the base station, the user equipment reports a measurement result to the base station providing the foregoing instruction; therefore, the following step may further be included.

S303: The base station receives a radio resource management RRM measurement result, obtained by the user equipment through measurement, within the sub-bandwidth.

According to this embodiment of the present invention, RSRP, RSSI, or RSRQ measurement within a sub-bandwidth may be performed on some cells or nodes, so that signal strength or signal quality, within different sub-bandwidths, of corresponding cells or nodes is obtained. Compared with the prior art in which there is only an RSRP, RSRQ, or an RSSI within a system bandwidth, this embodiment has the following advantages: even if transmit powers, at different locations of the system bandwidth, of cells are different, RRM measurement and reporting within corresponding sub-bandwidths can still be performed according to different sub-bandwidths, so that a change situation, in different frequency bands, of a feature of a large-size channel from the cell to the UE can be accurately reflected, and more-detailed reference information can be provided for a network side device (for example, a base station) to perform radio resource management.

Corresponding to the radio resource management measurement method shown in FIG. 3-*a*, an embodiment of the present invention further provides a radio resource management information measurement method. Referring to FIG. 3-*b*, the method mainly includes step S'301 to step S'302, and is described in detail in the following steps.

S'301: User equipment receives an instruction for performing radio resource management RRM measurement within at least one sub-bandwidth.

In this embodiment, a system bandwidth includes a maximum available system bandwidth, a downlink transmission bandwidth, or an uplink transmission bandwidth. The sub-bandwidth is obtained by dividing the system bandwidth, and the instruction is sent by a base station to the user equipment. For example, if the system bandwidth is 10 MHz, the base station may divide the system bandwidth into five sub-bandwidths with a bandwidth of 2 MHz, and separately perform RRM measurement for each sub-bandwidth, or perform RRM measurement for a first sub-bandwidth with a bandwidth of 2 MHz.

S'302: The user equipment performs the RRM measurement according to the instruction.

Further, the method further includes: receiving, by the user equipment, a size and/or location information, sent by the base station, within the at least one of the sub-bandwidths.

In this embodiment in which the user equipment receives the instruction for performing the radio resource management RRM measurement within the at least one sub-bandwidth, the user equipment may receive an instruction for measuring at least one of a reference signal received power RSRP, a received signal strength indicator RSSI, and reference signal received quality RSRQ within the sub-bandwidth. Specifically, the user equipment receives an instruction for calculating, according to a broadband RSRP and at least one sub-band RSSI, at least one RSRQ, or the user equipment receives an instruction for calculating, according to at least one sub-band RSRP and a broadband RSRP, at least one RSRQ, where at least one of the RSRP and the RSSI is broadband, or both of the RSRP and the RSSI are within partial bandwidths. For example, the user equipment may calculate M RSRQs according to a broadband RSRP and M sub-bandwidth RSSIs, or calculate N RSRQs according to a broadband RSSI and N sub-bandwidth RSRPs, or calculate a maximum of (M×N) RSRQs according to M sub-bandwidth RSSIs and N sub-bandwidth RSRPs. After performing radio resource management RRM information measurement within the at least one sub-bandwidth according to an instruction from the base station, the user equipment reports a measurement result to the base station providing the foregoing instruction; therefore, the following step may further be included:

S'303: The user equipment reports a radio resource management RRM measurement result, obtained through measurement, within the sub-bandwidth to the base station.

According to this embodiment of the present invention, RSRP, RSSI, or RSRQ measurement within a sub-bandwidth may be performed on some cells or nodes, so that signal strength or signal quality, within different sub-bandwidths, of corresponding cells or nodes is obtained. Compared with the prior art in which there is only an RSRP, RSRQ, or an RSSI within a system bandwidth, this embodiment has the following advantages: even if transmit powers, at different locations of the system bandwidth, of cells are different, RRM measurement and reporting within corresponding sub-bandwidths can still be performed according to different sub-bandwidths, so that a change situation, in different frequency bands, of a feature of a large-size channel from the cell to the UE can be accurately reflected, and more-detailed reference information can be provided for a network side device (for example, a base station) to perform radio resource management.

Referring to FIG. 4, FIG. 4 is a schematic structural diagram of a radio resource management measurement apparatus according to an embodiment of the present invention. For ease of description, only a part related to this embodiment of the present invention is shown. The radio resource management measurement apparatus shown in FIG. 4 may be a base station or a functional unit/module thereof, and the radio resource management measurement apparatus includes a configuration information determining module 401 and a configuration information sending module 402.

The configuration information determining module 401 is configured to determine at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement.

The configuration information sending module 402 is configured to send the configuration information to the user equipment, so that the user equipment performs the RRM measurement according to the configuration information.

It should be noted that, in an implementation manner of the foregoing radio resource management measurement apparatus, division of functional modules is used merely as an example for description. In an actual application, the foregoing functions may be implemented by different functional modules according to needs, for example, a configuration requirement of corresponding hardware, or in consideration of ease of software implementation, that is, an internal structure of the radio resource management measurement apparatus is divided into different functional modules to implement all or a part of functions described above. In addition, in an actual application, a corresponding functional module in this embodiment may be implemented by corresponding hardware, or may be implemented by executing, by corresponding hardware, corresponding software, for example, the foregoing configuration information determining module may be hardware capable of executing the determining at least one piece of configuration information used, by user equipment, for radio resource management RRM measurement, for example, a configuration information determining device, or may also be a general purpose processor or another hardware device that can execute a corresponding computer program to implement the foregoing function; for another example, the foregoing configuration information sending module may be hardware capable of executing the foregoing function of sending the configuration information to the user equipment, for example, a configuration information sender, or may also be a general purpose processor or another hardware device that can execute a corresponding computer program to implement the foregoing function (the above-described principles may be applied to all the embodiments provided in this specification).

According to the radio resource management measurement apparatus shown in FIG. 4, the RRM measurement may be at least one type of reference signal received power RSRP measurement, received signal strength indicator RSSI measurement, and reference signal received quality RSRQ measurement. The configuration information is a collective term of the RRM measurement type information, the signal type information used for the RRM measurement, the signal combination information used for the RRM measurement, and the like, but is not limited to these pieces of configuration information. In addition, the foregoing at least one piece of configuration information used for the RRM measurement is used for RRM measurement for different cells or different types of RRM measurement and may be independently configured, that is, for different types of RRM measurement, base stations are not associated with one another when configuring corresponding configuration information. For example, five different types of RRM are measured. When RRM measurement type information is configured for each type of RRM measurement, all pieces of RRM measurement type information may be different, or when signal type information used for RRM measurement is configured for each type of RRM measurement, all pieces of signal type information used for the RRM measurement may be different, or when signal combination information used for RRM measurement is configured for each type of RRM measurement, all pieces of signal combination information used for the RRM measurement may be different. For another example, as an embodiment in which configuration information used for RRM measurement is independently configured, a signal used for corresponding measurement may also be separately configured for each measurement item.

For example, if signals used for measuring an RSRP and an RSSI of a same new carrier type (NCT) cell are different, to-be-used signals are separately configured, for example, an RCRS is used for measuring the RSRP, and an IMR or a CSI-RS is used for measuring the RSSI. For still another example, multiple cells or nodes around a UE may have different configurations, for example, carrier types are different or sent signals or signal combinations are different. For example, not all of the cells or nodes send a same type of signal or signal combination that may be used for RRM measurement; in this case, at least one piece of configuration information used for related RRM measurement of the cells or nodes is independently configured, and configuration may be separately performed in terms of a configuration of each cell or node, thereby ensuring accuracy of RRM measurement performed by the UE for each cell or node.

It should be noted that, when the base station or the configuration information determining module 401 of the base station configures these pieces of configuration information, the configuration information may include only one or two types of the RRM measurement type information, the signal type information used for the RRM measurement, and the signal combination information used for the RRM measurement. When receiving the foregoing one or two types of configuration information, the user equipment may learn or determine remaining one or two types of configuration information according to a predefined association relationship. For example, if the configuration information includes only the RRM measurement type information, when receiving the RRM measurement type information, the user equipment may learn or determine, according to the predefined association relationship, the signal type information used for the RRM measurement and the signal combination information used for the RRM measurement.

According to the radio resource management measurement apparatus shown in FIG. 4, the RRM measurement type information includes any one type of or a combination of any several types of carrier type information, the signal type information, the signal combination information, and measurement item information that are used for instructing the user equipment to perform the RRM measurement; according to another radio resource management measurement apparatus shown in FIG. 4, the RRM measurement type information includes any one type of or a combination of any several types of a carrier type, the signal combination information, measurement item information, time domain parameter information, frequency domain parameter information, and measurement value adjustment parameter information that are used for instructing the user equipment to perform the RRM measurement, or includes any one type of or a combination of any several types of a carrier type, the signal type information, measurement item information, time domain parameter information, frequency domain parameter information, and measurement value adjustment parameter information that are used for instructing the user equipment to perform the RRM measurement; according to still another radio resource management measurement apparatus shown in FIG. 4, a signal type in the signal type information includes one of a cell-specific reference signal (CRS), a reduced cell-specific reference signal (RCRS), a primary synchronization signal (PSS), a secondary synchronization signal (SSS), a discovery reference signal (DRS), a broadcast channel (BCH) signal, an interference measurement resource (IMR), and a channel state information-reference signal (CSI-RS), and a signal combination in the signal combination information includes any combination formed by the cell-specific reference signal CRS, the reduced cell-specific reference signal RCRS, the primary synchronization signal PSS, the secondary synchronization signal SSS, the discovery reference signal DRS, the broadcast channel BCH signal, the interference measurement resource IMR, and the channel state information-reference signal CSI-RS. In the foregoing embodiment, the signal type information is used to indicate a type of a signal that needs to be used when the user equipment performs the RRM measurement, or a type of a signal and configuration information of the signal, the signal combination information is used to indicate a type of a group of signals that need to be used when the user equipment performs the RRM measurement and configuration information of the signals, and the carrier type information may be a normal carrier type (NCT), a legacy carrier type (LCT), new carrier type 1 (NCT1), new carrier type 2 (NCT2), or the like. Optionally, the carrier type information is corresponding to a predefined or default RRM measurement manner that is in the case of the carrier type information. For example, when the carrier type information is an LCT, the RRM measurement is performed based on the CRS, when the carrier type information is NCT1, the RRM measurement is performed based on the RCRS, and when the carrier type information is NCT2, the RRM measurement is performed based on the cell-specific CSI-RS. The measurement item information may specifically be performing which type of RRM measurement, including performing measurement on one or several of an RSRP, RSRQ, and an RSSI, for example, only the RSRP is measured, only the RSRP and the RSSI are measured, or the RSRP, the RSRQ, and the RSSI are all measured. Alternatively, the measurement item information may specifically refer to performing which type of RRM measurement on which type of signal, for example, performing reference signal received power RSRP measurement on the CRS and performing received signal strength indicator RSSI measurement on the CSI-RS, or refer to performing received signal strength indicator RSSI measurement on a signal sent in a cell corresponding to the RRM measurement and performing reference signal received power RSRP measurement on a signal of another cell synchronized with the cell corresponding to the RRM measurement, for example, performing the RRM measurement on an NCT cell, performing received signal strength indicator RSSI measurement on a CRS sent in the NCT cell, performing reference signal received power RSRP measurement on a CRS sent in an LCT cell synchronized with the NCT cell, and then calculating RSRQ by using an RSSI and an RSRP that are obtained through measurement.

As an embodiment of the present invention, when the base station configures the RRM measurement type information, the RRM measurement type information may include only one type or several types of the foregoing information. When receiving one type or several types of the foregoing configuration information, the user equipment may learn or determine remaining configuration information according to a predefined association relationship. For example, if the RRM measurement type information includes only the carrier type information, when receiving the RRM measurement type information, the user equipment may learn or determine, according to the predefined association relationship, any one type of or a combination of any several types of the signal type information or the signal combination information, the measurement item information, the time domain parameter information, the frequency domain parameter information, and the measurement value adjustment parameter information that are used for the RRM measurement. As another embodiment of the present invention, these pieces of configuration information may be configured by a serving cell of the UE.

As an embodiment of the present invention, these pieces of configuration information may be notified by means of broadcast signaling or dedicated signaling. For example, notification is performed for multiple UEs by means of broadcast RRC signaling, or notification is performed for one UE by means of dedicated RRC signaling.

As described in the foregoing, the signal type information may be used to indicate a type of a signal that needs to be used when the user equipment performs the RRM measurement and configuration information of the signal, and the signal combination information is used to indicate a type of a group of signals that need to be used when the user equipment performs the RRM measurement and configuration information of the signals. Specifically, for the RCRS, configuration information of the RCRS includes at least one of: whether the RCRS shifts, a shifting parameter, and time domain location information of the RCRS. For the CSI-RS, configuration information of the CSI-RS includes at least one of pattern information, time domain location information, and a scrambling code ID of the CSI-RS. For the PSS or the SSS, configuration information of the PSS or the SSS includes at least one of: whether there is the PSS or the SSS, frequency domain location information, and time domain location information. For the DRS, configuration information of the DRS includes at least one type of frequency domain location information and time domain location information, or corresponding sequence initialization ID information and at least one type of frequency domain location information and time domain location information. For a common control channel (for example, PBCH/ePBCH), configuration information of the common control channel includes scrambling code ID information of the common control channel, or may further include at least one type of frequency domain location information and time domain location information. For example, when instructing user equipment to use a PSS/SSS to perform RRM measurement for a cell, a base station simultaneously notifies the user equipment of at least one type of frequency domain location information and time domain location information of the PSS/SSS; when instructing user equipment to use a PSS/SSS to perform one type of RRM measurement, a base station simultaneously notifies the user equipment of corresponding sequence initialization ID information and at least one type of frequency domain location information and time domain location information of the PSS/SSS; when instructing user equipment to use a DRS to perform RRM measurement for a cell, a base station simultaneously notifies the user equipment of at least one type of frequency domain location information and time domain location information of the DRS; when instructing user equipment to use a DRS to perform one type of RRM measurement, a base station simultaneously notifies the user equipment of corresponding sequence initialization ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; when instructing user equipment to use a PSS/SSS and a CRS to perform RRM measurement for a cell, a base station simultaneously notifies the user equipment of at least one type of frequency domain location information and time domain location information of the PSS/SSS; when instructing user equipment to use a DRS to perform RRM measurement for a cell or to perform one type of RRM measurement, a base station simultaneously notifies the user equipment of scrambling code ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; or when instructing user equipment to use an IMR or a ZP CSI-RS to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information.

For the foregoing embodiment in which the configuration information includes the signal type information used for the RRM measurement, the base station may, during configuration, configure that the user equipment uses different types of signals to perform measurement for different types of RRM measurement, or configure, for multiple types of RRM measurement, that the user equipment uses one type of signal to perform RRM measurement for some types of RRM measurement, and uses a signal combination to perform RRM measurement for the other types of RRM measurement, where signals and signal combinations corresponding to the multiple types of RRM measurement may be different.

After performing the RRM measurement according to the configuration information delivered by the base station, the user equipment feeds back a measurement result to the base station that delivers the configuration information.

In this embodiment in which the RRM measurement type information determined by the configuration information determining module 401 includes any one type of or a combination of any several types of a carrier type, the signal type information or the signal combination information, measurement item information, time domain parameter information, frequency domain parameter information, and measurement value adjustment parameter information that are used for instructing the user equipment to perform the RRM measurement, when the RRM measurement type information includes a measurement value adjustment parameter used by the user equipment for the RRM measurement, as an embodiment of the present invention, the measurement value adjustment parameter for the RRM includes weight values of measurement values that are obtained from at least two types of signals in the signal combination information when the user equipment is instructed to use the at least two types of signals to measure a same measurement item, and the weight values are used by the user equipment to perform statistical averaging on the measurement values of the measurement item according to the weight values, so as to obtain a measurement result of the measurement item. For example, statistical averaging is performed on RSRP values obtained through measurement on an RCRS and a PSS/SSS, a weight value of the RSRP value obtained through measurement on the RCRS is 30%, a weight value of the RSRP value obtained through measurement on the PSS/SSS is 70%, and the statistical averaging is performed according to weighted values to obtain the measurement result of an RSRP. When the RRM measurement type information includes a measurement value adjustment parameter used by the user equipment for the RRM measurement, as another embodiment of the present invention, the measurement value adjustment parameter includes weight values of measurement values that are obtained from at least two types of signals in the signal combination type when the user equipment uses the at least two types of signals to measure a same measurement item, and first adjustment values of the measurement values that are obtained from the at least two types of signals in the signal combination type when the user equipment uses the at least two types of signals to measure the same measurement item, and the weight values and the first adjustment values are used by the user equipment to adjust the measurement values according to the first adjustment values and then to perform statistical averaging on adjusted measurement values according to the weight values, so as to obtain a measurement result of the measurement item. For example, when statistical averaging is performed on RSRP values obtained through measurement on an RCRS and a PSS/SSS, if the RSRP value obtained through the measurement on the RCRS is M dB, an adjustment value is 1 dB, the RSRP value obtained through the measurement on the PSS/SSS is N dB, and an adjustment value is 0 dB, an RSRP, on the RCRS, obtained after adjustment is (M+1) dB, an RSRP, on the PSS/SSS, obtained after adjustment is (N−0) dB, and then statistical averaging or feedback is performed. When the RRM measurement type information includes a measurement value adjustment parameter used by the user equipment for the RRM measurement, as still another embodiment of the present invention, the measurement value adjustment parameter includes second adjustment values of measurement values that are obtained from at least two types of signals when the user equipment uses the at least two types of signals to measure a same measurement item, and the second adjustment values are used for instructing the user equipment to: when the measurement values are compared with a threshold of the measurement item or compared with another measurement value, adjust the measurement values according to the second adjustment values and then compare adjusted measurement values with the threshold of the measurement item or with the another measurement value. When the RRM measurement type information includes a measurement value adjustment parameter used by the user equipment for the RRM measurement, as still another embodiment of the present invention, when the RRM measurement type information includes the measurement value adjustment parameter used for instructing the user equipment to perform the RRM measurement, the measurement value adjustment parameter includes third adjustment values of measurement values that are obtained from at least two types of signals when the user equipment uses the at least two types of signals to measure a same measurement item, where the third adjustment values are used by the user equipment to adjust the measurement values according to the third adjustment values and then to calculate another measurement item by using adjusted measurement values.

In this embodiment of the present invention, a base station may configure different RRM measurement value adjustment parameters according to RRM measurement for different cells or different types of RRM measurement that need to be performed by a UE, so that different measurement value adjustment parameters may be set for the different types of RRM measurement according to correspondingly used signals or signal types or parameters of the signals, instead of using a same measurement value adjustment parameter for RRM measurement for all cells or all types of RRM measurement, thereby ensuring accuracy of adjustment on RRM measurement performed by the UE for a cell or node.

In the foregoing embodiment of the present invention, an information item included in the RRM measurement type information, the signal type information, or the signal combination information has a corresponding index number. As an embodiment of the configuration information sending module 402, the configuration information sending module 402 may include a first sending unit 501. As shown in FIG. 5, another embodiment of the present invention provides a radio resource management measurement apparatus. The first sending unit 501 may send, to the user equipment, the index number corresponding to the information item included in the foregoing RRM measurement type information, the foregoing signal type information, or the foregoing signal combination information, so that the user equipment searches a correspondence table according to the index number to: acquire the RRM measurement type information or the signal combination information corresponding to the index number, and then measure the RRM.

As an embodiment of the configuration information sending module 402, the configuration information sending module 402 may include a second sending unit 601. As shown in FIG. 6, another embodiment of the present invention provides a radio resource management measurement apparatus. The second sending unit 601 may send a correspondence table and the index number to the user equipment, so that the user equipment searches the correspondence table according to the index number to: acquire the RRM measurement type information or the signal combination information corresponding to the index number, and then measure the RRM. According to the radio resource management measurement apparatus shown in FIG. 5 or FIG. 6, the correspondence table may be predefined, and the correspondence table includes a correspondence between the index number and the RRM measurement type information or a correspondence between the index number and the signal combination information.

According to the radio resource management measurement apparatus shown in FIG. 5 or FIG. 6, the configuration information sending module 402 does not directly send, to the user equipment, the information item included in the RRM measurement type information, the signal type information, or the signal combination information, but the first sending unit 501 or the second sending unit 601 sends a corresponding index number, so that signaling is reduced, and signaling design complexity is reduced.

Corresponding to the radio resource management measurement apparatus shown in FIG. 4, an embodiment of the present invention further provides a radio resource management information measurement apparatus. Referring to FIG. 7-a, FIG. 7-a is a schematic structural diagram of a radio resource management information measurement apparatus according to an embodiment of the present invention. For ease of description, only a part related to this embodiment of the present invention is shown. The radio resource management information measurement apparatus shown in FIG. 7-a may be user equipment or a functional unit/module thereof, and the radio resource management information measurement apparatus includes a configuration information receiving module 701, a measurement module 702, and a feedback module 703.

The configuration information receiving module 701 is configured to receive at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement.

The measurement module 702 is configured to perform the RRM measurement according to the configuration information.

The feedback module 703 is configured to feed back a measurement result of performing the RRM measurement to the base station.

It should be noted that, in an implementation manner of the foregoing radio resource management information measurement apparatus, division of functional modules is used merely as an example for description. In an actual application, the foregoing functions may be implemented by different functional modules according to needs, for example, a configuration requirement of corresponding hardware, or in consideration of ease of software implementation, that is, an internal structure of the radio resource management information measurement apparatus is divided into different functional modules to implement all or a part of functions described above. In addition, in an actual application, a corresponding functional module in this embodiment may be implemented by corresponding hardware, or may be implemented by executing, by corresponding hardware, corresponding software, for example, the foregoing configuration information receiving module may be hardware capable of executing the receiving at least one piece of configuration information that is used for radio resource management RRM measurement and that is delivered by a base station, for example, a configuration information receiver, or may also be a general purpose processor or another hardware device that can execute a corresponding computer program to implement the foregoing function; for another example, the foregoing measurement module may be hardware capable of executing the foregoing function of performing the RRM measurement according to the configuration information, for example, a measuring device, or may also be a general purpose processor or another hardware device that can execute a corresponding computer program to implement the foregoing function (the above-described principles may be applied to all the embodiments provided in this specification).

As described in the foregoing, the RRM measurement may be at least one type of RSRP measurement, RSSI measurement, and RSRQ measurement. The configuration information is configured by the base station and delivered to the configuration information receiving module 701 of the user equipment, and the configuration information is a collective term of the RRM measurement type information, the signal type information used for the RRM measurement, the signal combination information used for the RRM measurement, and the like, but is not limited to these pieces of configuration information. In addition, the foregoing at least one piece of configuration information used for the RRM measurement is used for RRM measurement for different cells or different types of RRM measurement and may be independently configured, that is, for different types of RRM measurement, base stations are not associated with one another when configuring corresponding configuration information. For example, five different types of RRM are measured. When RRM measurement type information is configured for each type of RRM measurement, all pieces of RRM measurement type information may be different, or when signal type information used for RRM measurement is configured for each type of RRM measurement, all pieces of signal type information used for the RRM measurement may be different, or when signal combination information used for RRM measurement is configured for each type of RRM measurement, all pieces of signal combination information used for the RRM measurement may be different. For another example, as an embodiment in which configuration information used for RRM measurement is independently configured, a signal used for corresponding measurement may also be separately configured for each measurement item. For example, if signals used for measuring an RSRP and an RSSI of a same new carrier type NCT cell are different, to-be-used signals are separately configured, for example, an RCRS is used for measuring the RSRP, and an IMR or a CSI-RS is used for measuring the RSSI. For still another example, multiple cells or nodes around a UE may have different configurations, for example, carrier types are different or sent signals or signal combinations are different. For example, not all of the cells or nodes send a same type of signal or signal combination that may be used for RRM measurement; in this case, at least one piece of configuration information used for related RRM measurement of the cells or nodes is independently configured, and configuration may be separately performed in terms of a configuration of each cell or node, thereby ensuring accuracy of RRM measurement performed by the UE for each cell or node.

It should be noted that, when the base station configures these pieces of configuration information, the configuration information may include only one or two types of the RRM measurement type information, the signal type information used for the RRM measurement, and the signal combination information used for the RRM measurement. When the configuration information receiving module 701 receives the foregoing one or two types of configuration information, the user equipment may learn or determine remaining one or two types of configuration information according to a predefined association relationship. For example, if the configuration information includes only the RRM measurement type information, when the configuration information receiving module 701 receives the RRM measurement type information, the user equipment may learn or determine, according to the predefined association relationship, the signal type information used for the RRM measurement and the signal combination information used for the RRM measurement. In an embodiment of the present invention, the RRM measurement type information includes any one type of or a combination of any several types of carrier type information, the signal type information, the signal combination information, and measurement item information that are used for instructing the user equipment to perform the RRM measurement; in still another embodiment of the present invention, the RRM measurement type information includes any one type of or a combination of any several types of a carrier type, the signal combination information, measurement item information, time domain parameter information, frequency domain parameter information, and measurement value adjustment parameter information that are used for instructing the user equipment to perform the RRM measurement, or includes any one type of or a combination of any several types of a carrier type, the signal type information, measurement item information, time domain parameter information, frequency domain parameter information, and measurement value adjustment parameter information that are used for instructing the user equipment to perform the RRM measurement; in still another embodiment of the present invention, a signal type in the signal type information includes one of a cell-specific reference signal (CRS), a reduced cell-specific reference signal (RCRS), a primary synchronization signal (PSS), a secondary synchronization signal (SSS), a discovery reference signal (DRS), a broadcast channel (BCH) signal, an interference measurement resource (IMR), and a channel state information-reference signal (CSI-RS), and a signal combination in the signal combination information includes any combination formed by the cell-specific reference signal (CRS), the reduced cell-specific reference signal (RCRS), the primary synchronization signal (PSS), the secondary synchronization signal (SSS), the discovery reference signal (DRS), the broadcast channel (BCH) signal, the interference measurement resource (IMR), and the channel state information-reference signal (CSI-RS). In the foregoing embodiment, the signal type information is used to indicate a type of a signal that needs to be used when the user equipment performs the RRM measurement, or a type of a signal and configuration information of the signal, the signal combination information is used to indicate a type of a group of signals that need to be used when the user equipment performs the RRM measurement and configuration information of the signals, and the carrier type information may be a normal carrier type (NCT), a legacy carrier type (LCT), new carrier type 1 (NCT1), new carrier type 2 (NCT2), or the like. Optionally, the carrier type information may be corresponding to a predefined or default RRM measurement manner that is in the case of the carrier type information. For example, when the carrier type information is an LCT, the RRM measurement is performed based on the CRS, when the carrier type information is NCT1, the RRM measurement is performed based on the RCRS, and when the carrier type information is NCT2, the RRM measurement is performed based on the cell-specific CSI-RS. The measurement item information may specifically be performing which type of RRM measurement, including performing measurement on one or several of an RSRP, RSRQ, and an RSSI, for example, only the RSRP is measured, only the RSRP and the RSSI are measured, or the RSRP, the RSRQ, and the RSSI are all measured. Alternatively, the measurement item information may specifically refer to performing which type of RRM measurement on which type of signal, for example, performing reference signal received power RSRP measurement on the CRS and performing received signal strength indicator RSSI measurement on the CSI-RS, or refer to performing received signal strength indicator RSSI measurement on a signal sent in a cell corresponding to the RRM measurement and performing reference signal received power RSRP measurement on a signal of another cell synchronized with the cell corresponding to the RRM measurement, for example, performing the RRM measurement on an NCT cell, performing received signal strength indicator RSSI measurement on a CRS sent in the NCT cell, performing reference signal received power RSRP measurement on a CRS sent in an LCT cell synchronized with the NCT cell, and then calculating RSRQ by using an RSSI and an RSRP that are obtained through measurement.

As an embodiment of the present invention, when the base station configures the RRM measurement type information, the RRM measurement type information may include only one type or several types of the foregoing information. When the configuration information receiving module 701 receives one type or several types of the foregoing configuration information, the user equipment may learn or determine remaining configuration information according to a predefined association relationship. For example, if the RRM measurement type information includes only the carrier type information, when the configuration information receiving module 701 receives the RRM measurement type information, the user equipment may learn or determine, according to the predefined association relationship, any one type of or a combination of any several types of the signal type information or the signal combination information, the measurement item information, the time domain parameter information, the frequency domain parameter information, and the measurement value adjustment parameter information that are used for the RRM measurement. As another embodiment of the present invention, these pieces of configuration information may be configured by a serving cell of the user equipment.

As an embodiment of the present invention, these pieces of configuration information may be notified by means of broadcast signaling or dedicated signaling. For example, notification is performed for multiple user equipments by means of broadcast RRC signaling, or notification is performed for one user equipment by means of dedicated RRC signaling.

As described in the foregoing, the signal type information may be used to indicate a type of a signal that needs to be used when the user equipment performs the RRM measurement and configuration information of the signal, and the signal combination information is used to indicate a type of a group of signals that need to be used when the user equipment performs the RRM measurement and configuration information of the signals. Specifically, for the RCRS, configuration information of the RCRS includes at least one of: whether the RCRS shifts, a shifting parameter, and time domain location information of the RCRS. For the CSI-RS, configuration information of the CSI-RS includes at least one of pattern information, time domain location information, and a scrambling code ID of the CSI-RS. For the PSS or the SSS, configuration information of the PSS or the SSS includes at least one of: whether there is the PSS or the SSS, frequency domain location information, and time domain location information. For the DRS, configuration information of the DRS includes at least one type of frequency domain location information and time domain location information, or corresponding sequence initialization ID information and at least one type of frequency domain location information and time domain location information. For a common control channel (for example, PBCH/ePBCH), configuration information of the common control channel includes scrambling code ID information of the common control channel, or may further include at least one type of frequency domain location information and time domain location information. For example, when instructing user equipment to use a PSS/SSS to perform RRM measurement for a cell, a base station simultaneously notifies the user equipment of at least one type of frequency domain location information and time domain location information of the PSS/SSS; when instructing user equipment to use a PSS/SSS to perform one type of RRM measurement, a base station simultaneously notifies the user equipment of corresponding sequence initialization ID information and at least one type of frequency domain location information and time domain location information of the PSS/SSS; when instructing user equipment to use a DRS to perform RRM measurement for a cell, a base station simultaneously notifies the user equipment of at least one type of frequency domain location information and time domain location information of the DRS; when instructing user equipment to use a DRS to perform one type of RRM measurement, a base station simultaneously notifies the user equipment of corresponding sequence initialization ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; when instructing user equipment to use a PSS/SSS and a CRS to perform RRM measurement for a cell, a base station simultaneously notifies the user equipment of at least one type of frequency domain location information and time domain location information of the PSS/SSS; when instructing user equipment to use a DRS to perform RRM measurement for a cell or to perform one type of RRM measurement, a base station simultaneously notifies the user equipment of scrambling code ID information and at least one type of frequency domain location information and time domain location information of the DRS; when instructing user equipment to use a common control channel (for example, PBCH/ePBCH) to perform RRM measurement for a cell or to perform one type of RRM measurement, a base station simultaneously notifies the user equipment of scrambling code ID information of the common control channel (for example, PBCH/ePBCH), or may further notify at least one type of frequency domain location information and time domain location information; or when instructing user equipment to use an IMR or a ZP CSI-RS to perform RRM measurement for a cell or to perform one type of RRM measurement, a base station simultaneously notifies the user equipment of at least one type of frequency domain location information and time domain location information of the IMR or the ZP CSI-RS.

Specifically, when the UE receives the configuration information notified by the base station, the configuration information includes one of the following manners: the configuration information is configuration information for each type of RRM measurement, and the configuration information includes a cell list or an RRM measurement list for the RRM measurement performed according to the configuration information; or the configuration information is RRM measurement configuration information corresponding to each type of RRM measurement or RRM measurement for each cell.

It can be learned from the foregoing radio resource management measurement method provided in this embodiment of the present invention that, at least one piece of configuration information that is used for radio resource management RRM measurement, that is delivered by a base station, and that is received by user equipment includes at least one type of RRM measurement type information, signal type information used for the RRM measurement, and signal combination information used for the RRM measurement. Therefore, compared with the prior art in which a DRS is blindly detected, the method provided in this embodiment of the present invention has the following advantages: user equipment is enabled to directly perform multiple types of RRM measurement according to configuration information and to process multiple RRM measurement results, without blindly detecting a related configuration of each cell nearby, thereby reducing complexity of user equipment and improving accuracy of RRM measurement and processing; in addition, the UE receives different configuration information used by the base station for RRM measurement for different cells or different types of RRM measurement, so that it can be ensured that the UE performs RRM measurement in terms of a feature of a signal sent in a corresponding cell or at a corresponding transmission point, instead of performing all types of RRM measurement according to only one type of signal, thereby improving accuracy of radio resource management RRM measurement and processing.

In this embodiment in which the RRM measurement type information includes any one type of or a combination of any several types of a carrier type, the signal type information or the signal combination information, measurement item information, time domain parameter information, frequency domain parameter information, and measurement value adjustment parameter information that are used for instructing the user equipment to perform the RRM measurement, when the RRM measurement type information includes a measurement value adjustment parameter used by the user equipment for the RRM measurement, as an embodiment of the present invention, the measurement value adjustment parameter for the RRM includes weight values of measurement values that are obtained from at least two types of signals in the signal combination information when the user equipment is instructed to use the at least two types of signals to measure a same measurement item, and the weight values are used by the user equipment to perform statistical averaging on the measurement values of the measurement item according to the weight values, so as to obtain a measurement result of the measurement item. For example, statistical averaging is performed on RSRP values obtained through measurement on an RCRS and a PSS/SSS, a weight value of the RSRP value obtained through measurement on the RCRS is 30%, a weight value of the RSRP value obtained through measurement on the PSS/SSS is 70%, and the user equipment performs statistical averaging according to weighted values to obtain the measurement result of an RSRP. When the RRM measurement type information includes a measurement value adjustment parameter used by the user equipment for the RRM measurement, as another embodiment of the present invention, the measurement value adjustment parameter includes weight values of measurement values that are obtained from at least two types of signals in the signal combination type when the user equipment uses the at least two types of signals to measure a same measurement item, and first adjustment values of the measurement values that are obtained from the at least two types of signals in the signal combination type when the user equipment uses the at least two types of signals to measure the same measurement item, and the weight values and the first adjustment values are used by the user equipment to adjust the measurement values according to the first adjustment values and then to perform statistical averaging on adjusted measurement values according to the weight values, so as to obtain a measurement result of the measurement item. For example, when statistical averaging is performed on RSRP values obtained through measurement on an RCRS and a PSS/SSS, if the RSRP value obtained through the measurement on the RCRS is M dB, an adjustment value is 1 dB, the RSRP value obtained through the measurement on the PSS/SSS is N dB, and an adjustment value is 0 dB, an RSRP, on the RCRS, obtained by the user equipment after adjustment is (M+1) dB, an RSRP, on the PSS/SSS, obtained by the user equipment after adjustment is (N−0) dB, and then statistical averaging or feedback is performed. When the RRM measurement type information includes a measurement value adjustment parameter used by the user equipment for the RRM measurement, as still another embodiment of the present invention, the measurement value adjustment parameter includes second adjustment values of measurement values that are obtained from at least two types of signals when the user equipment uses the at least two types of signals to measure a same measurement item, and the second adjustment values are used for instructing the user equipment to: when the measurement values are compared with a threshold of the measurement item or compared with another measurement value, adjust the measurement values according to the second adjustment values and then compare adjusted measurement values with the threshold of the measurement item or with the another measurement value. When the RRM measurement type information includes a measurement value adjustment parameter used by the user equipment for the RRM measurement, as still another embodiment of the present invention, when the RRM measurement type information includes the measurement value adjustment parameter used for instructing the user equipment to perform the RRM measurement, the measurement value adjustment parameter includes third adjustment values of measurement values that are obtained from at least two types of signals when the user equipment uses the at least two types of signals to measure a same measurement item, where the third adjustment values are used by the user equipment to adjust the measurement values according to the third adjustment values and then to calculate another measurement item by using adjusted measurement values. In this embodiment of the present invention, RRM measurement configuration information that is sent by a base station and that is received by a UE may include different RRM measurement value adjustment parameters configured for RRM measurement for different cells or different types of RRM measurement that need to be performed by the UE, so that different measurement value adjustment parameters may be set for the different types of RRM measurement according to correspondingly used signals or signal types or parameters of the signals, instead of using a same measurement value adjustment parameter for RRM measurement for all cells or all types of RRM measurement, thereby ensuring accuracy of adjustment on RRM measurement performed by the UE for a cell or node.

In the foregoing embodiment of the present invention, an information item included in the RRM measurement type information, the signal type information, or the signal combination information has a corresponding index number. In this case, the configuration information receiving module 701 shown in FIG. 7-*a* includes a first receiving unit 704, the measurement module 702 shown in FIG. 7-*a* includes a first measurement unit 705, and as shown in FIG. 7-*b*, another embodiment provides a radio resource management information measurement apparatus; or the configuration information receiving module 701 shown in FIG. 7-*a* includes a second receiving unit 706, the measurement module 702 shown in FIG. 7-*a* includes a second measurement unit 707, and as shown in FIG. 7-*c*, another embodiment provides a radio resource management information measurement apparatus.

The first receiving unit 704 is configured to receive the index number sent by the base station.

The first measurement unit 705 is configured to search a correspondence table according to the index number to: acquire the RRM measurement type information or the signal combination information corresponding to the index number, and then measure the RRM.

The second receiving unit 706 is configured to receive a correspondence table and the index number that are sent by the base station.

The second measurement unit 707 is configured to search the correspondence table according to the index number to: acquire the RRM measurement type information or the signal combination information corresponding to the index number, and then measure the RRM.

According to the radio resource management information measurement apparatus shown in FIG. 7-*b* or FIG. 7-*c*, the correspondence table may be predefined, and the correspondence table includes a correspondence between the index number and the RRM measurement type information or a correspondence between the index number and the signal combination information. The user equipment does not directly receive the RRM measurement type information, the signal type information, or the signal combination information, but receives only the corresponding index number, so that signaling is reduced, and signaling design complexity is reduced.

Referring to FIG. 8, FIG. 8 is a schematic structural diagram of a radio resource management information measurement apparatus according to another embodiment of the present invention. For ease of description, only a part related to this embodiment of the present invention is shown. The radio resource management information measurement apparatus shown in FIG. 8 may be a base station or a functional unit/module thereof, and the radio resource management information measurement apparatus includes a division module 801 and an instruction module 803.

The division module 801 is configured to divide a system bandwidth into several sub-bandwidths, where the system bandwidth includes a maximum available system bandwidth, a downlink transmission bandwidth, an uplink transmission bandwidth, or a maximum uplink available system bandwidth.

The instruction module 802 is configured to instruct user equipment to perform radio resource management RRM information measurement within at least one of the sub-bandwidths.

A base station receives a radio resource management RRM measurement result, obtained by the instruction module 802 through measurement, within the sub-bandwidth.

According to the radio resource management information measurement apparatus shown in FIG. 8, RSRP, RSSI, or RSRQ measurement within a sub-bandwidth may be performed on some cells or nodes, so that signal strength or signal quality, within different sub-bandwidths, of corresponding cells or nodes is obtained. Compared with the prior art in which there is only an RSRP, RSRQ, or an RSSI within a system bandwidth, this embodiment has the following advantages: even if transmit powers, at different locations of the system bandwidth, of cells are different, RRM measurement and reporting within corresponding sub-bandwidths can still be performed according to different sub-bandwidths, so that a change situation, in different frequency bands, of a feature of a large-size channel from the cell to the UE can be accurately reflected, and more-detailed reference information can be provided for a network side device (for example, a base station) to perform radio resource management.

It should be noted that, in an implementation manner of the foregoing radio resource management information measurement apparatus, division of functional modules is used merely as an example for description. In an actual application, the foregoing functions may be implemented by different functional modules according to needs, for example, a configuration requirement of corresponding hardware, or in consideration of ease of software implementation, that is, an internal structure of the radio resource management information measurement apparatus is divided into different functional modules to implement all or a part of functions described above. In addition, in an actual application, a corresponding functional module in this embodiment may be implemented by corresponding hardware, or may be implemented by executing, by corresponding hardware, corresponding software, for example, the foregoing division module may be hardware capable of executing the dividing a system bandwidth into several sub-bandwidths, for example, a divider, or may also be a general purpose processor or another hardware device that can execute a corresponding computer program to implement the foregoing function; for another example, the foregoing instruction module may be hardware capable of executing the foregoing function of instructing user equipment to perform radio resource management RRM information measurement within at least one of the sub-bandwidths, for example, an indicator, or may also be a general purpose processor or another hardware device that can execute a corresponding computer program to implement the foregoing function (the above-described principles may be applied to all the embodiments provided in this specification).

The radio resource management information measurement apparatus shown in FIG. 8 may further include a sending module 901, and as shown in FIG. 9, another embodiment of the present invention provides a radio resource management measurement apparatus. The sending module 901 is configured to send a size and/or location information of the at least one of the sub-bandwidths to user equipment.

The instruction module 802 shown in FIG. 8 or FIG. 9 may include a first instruction submodule 1001, and as shown in FIG. 10-*a* or FIG. 10-*b*, another embodiment of the present invention provides a radio resource management measurement apparatus 10. The first instruction submodule 1001 is configured to instruct user equipment to measure one of a reference signal received power RSRP, a received signal strength indicator RSSI, and reference signal received quality RSRQ within the sub-bandwidth.

The first instruction submodule 1001 shown in FIG. 10-*a* or FIG. 10-*b* may include a first instruction unit 1101, and as shown in FIG. 11-*a* or FIG. 11-*b*, another embodiment of the present invention provides a radio resource management measurement apparatus 11. The first instruction unit 1101 is configured to instruct user equipment to calculate at least one RSRQ according to a broadband RSRP and at least one sub-band RSSI, or to instruct user equipment to calculate at least one RSRQ according to at least one sub-band RSRP and a broadband RSRP.

Corresponding to the radio resource management information measurement apparatus shown in FIG. 8, another embodiment of the present invention provides a radio resource management information measurement apparatus, as shown in FIG. 12. The radio resource management information measurement apparatus shown in FIG. 12 may be user equipment or a functional unit/module thereof, and the radio resource management information measurement apparatus includes an instruction receiving module 1201 and a measurement module 1202.

The instruction receiving module 1201 is configured to receive an instruction for performing radio resource management RRM measurement within at least one sub-bandwidth, where the sub-bandwidth is obtained by dividing a system bandwidth, and the instruction is sent by a base station to the user equipment.

The measurement module 1202 is configured to perform the RRM measurement according to the instruction.

The user equipment reports a radio resource management RRM measurement result, obtained by the measurement module 1202 through measurement, within the sub-bandwidth to the base station.

According to the radio resource management information measurement apparatus shown in FIG. 12, RSRP, RSSI, or RSRQ measurement within a sub-bandwidth may be performed on some cells or nodes, so that signal strength or signal quality, within different sub-bandwidths, of corresponding cells or nodes is obtained. Compared with the prior art in which there is only an RSRP, RSRQ, or an RSSI within a system bandwidth, this embodiment has the following advantages: even if transmit powers, at different locations of the system bandwidth, of cells are different, RRM measurement and reporting within corresponding sub-bandwidths can still be performed according to different sub-bandwidths, so that a change situation, in different frequency bands, of a feature of a large-size channel from the cell to the UE can be accurately reflected, and more-detailed reference information can be provided for a network side device (for example, a base station) to perform radio resource management.

The radio resource management information measurement apparatus shown in FIG. 12 may further include an information receiving module 1301, and as shown in FIG. 13, another embodiment of the present invention provides a radio resource management measurement apparatus. The information receiving module 1301 is configured to receive a size and/or location information of at least one sub-bandwidth sent by a base station.

The instruction receiving module 1201 shown in FIG. 12 or FIG. 13 may include a receiving submodule 1401, and as shown in FIG. 14-*a* or FIG. 14-*b*, another embodiment of the present invention provides a radio resource management measurement apparatus 14. The receiving submodule 1401 is configured to receive an instruction for measuring at least one of a reference signal received power RSRP, a received signal strength indicator RSSI, and reference signal received quality RSRQ within a sub-bandwidth.

The receiving submodule 1401 shown in FIG. 14-*a* or FIG. 14-*b* may include a first receiving unit 1501 or a second receiving unit 1502, and as shown in FIG. 15-*a* or FIG. 15-*b*, another embodiment of the present invention provides a radio resource management measurement apparatus 15. The first receiving unit 1501 is configured to receive an instruction for calculating, according to a broadband RSRP and at least one sub-band RSSI, at least one RSRQ. The second receiving unit 1502 is configured to receive an instruction for calculating, according to at least one sub-band RSRP and a broadband RSRP, at least one RSRQ.

An embodiment of the present invention further provides a computer storage medium, where the computer storage medium may store a program; when executed, the program includes the steps shown in FIG. 1.

Another embodiment of the present invention further provides a computer storage medium, where the computer storage medium may store a program; when executed, the program includes the steps shown in FIG. 2.

Another embodiment of the present invention further provides a computer storage medium, where the computer storage medium may store a program; when executed, the program includes the steps shown in FIG. 3-*a*.

Another embodiment of the present invention further provides a computer storage medium, where the computer storage medium may store a program; when executed, the program includes the steps shown in FIG. 3-*b*.

An embodiment of the present invention further provides a base station, including: an input apparatus, an output apparatus, a memory, and a processor, where the processor executes the following steps: determining at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and sending the configuration information to the user equipment, so that the user equipment performs the RRM measurement according to the configuration information.

Another embodiment of the present invention further provides a base station, including: an input apparatus, an output apparatus, a memory, and a processor, where the processor executes the following steps: dividing a system bandwidth into several sub-bandwidths; and instructing user equipment to perform radio resource management RRM measurement within at least one of the sub-bandwidths.

An embodiment of the present invention further provides user equipment, including: an input apparatus, an output apparatus, a memory, and a processor, where the processor executes the following steps: receiving at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; performing the RRM measurement according to the configuration information; and feeding back a measurement result of performing the RRM measurement to the base station.

Another embodiment of the present invention further provides user equipment, including: an input apparatus, an output apparatus, a memory, and a processor, where the processor executes the following steps: receiving an instruction for performing radio resource management RRM measurement within at least one sub-bandwidth, where the sub-bandwidth is obtained by dividing a system bandwidth, and the instruction is sent by a base station to the user equipment; and performing the RRM measurement according to the instruction.

It should be noted that, because content such as information exchange between modules/units and an execution process of the foregoing apparatus is based on a same concept as the method embodiments of the present invention, a technical effect brought by the apparatus is the same as that of the method embodiments of the present invention. For details, reference may be made to descriptions in the method embodiments of the present invention, which are not described herein again.

A person of ordinary skill in the art may understood that, all or a part of the steps in the methods in the foregoing embodiments may be implemented by a program instructing relevant hardware, for example, one or more or all of the following methods.

Method 1: Determine at least one piece of configuration information used, by user equipment, for radio resource management RRM measurement, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; and send the configuration information to the user equipment, so that the user equipment performs the RRM measurement according to the configuration information.

Method 2: User equipment receives at least one piece of configuration information that is used for radio resource management RRM measurement and that is delivered by a base station, where the configuration information includes at least one type of RRM measurement type information, signal type information used for the RRM measurement, and signal combination information used for the RRM measurement, and the RRM measurement includes at least one type of reference signal received power RSRP measurement, received signal strength indicator RSSI measurement, and reference signal received quality RSRQ measurement; the user equipment performs the RRM measurement according to the configuration information; and the user equipment feeds back a measurement result of performing the RRM measurement to the base station.

Method 3: Divide a system bandwidth into several sub-bandwidths; and instruct user equipment to perform radio resource management RRM measurement within at least one of the sub-bandwidths.

Method 4: User equipment receives an instruction for performing radio resource management RRM measurement within at least one sub-bandwidth, where the sub-bandwidth is obtained by dividing a system bandwidth, and the instruction is sent by a base station to the user equipment; and the user equipment performs the RRM measurement according to the instruction.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The radio resource management information measurement method and apparatus, and the device that are provided in the embodiments of the present invention are described in detail in the foregoing, specific examples are used in this specification to elaborate principles and implementation manners of the present invention, and descriptions of the foregoing embodiments are used merely for helping understand the method and a core idea of the present invention. A person of ordinary skill in the art may make modifications to the present invention in terms of the specific implementation manners and the application scope according to an idea of the present invention. Therefore, this specification shall not be construed as a limitation on the present invention.

What is claimed is:

1. A method, comprising:
    determining, by a base station, configuration information that includes radio resource management (RRM) measurement type information and signal combination information having a corresponding index number for an RRM measurement, wherein the signal combination information indicates a signal combination of a primary synchronization signal (PSS), a secondary synchronization signal (SSS), and a broadcast channel (BCH) signal for the RRM measurement, wherein the RRM measurement includes at least one type of a reference signal received power (RSRP) measurement, a received signal strength indicator (RSSI) measurement, and a reference signal received quality (RSRQ) measurement, and wherein there is at least one of a correspondence between the index number and the RRM measurement type information or a correspondence between the index number and the signal combination information; and
    sending, by the base station, the configuration information that includes the RRM measurement type information and the signal combination information to a user equipment.

2. The method according to claim 1, wherein the configuration information is used for RRM measurement for different cells.

3. The method according to claim 1, wherein the RRM measurement type information comprises at least one of a carrier type information, measurement item information, or measurement value adjustment parameter information, and wherein the measurement item information indicates the type of the RRM measurement.

4. The method according to claim 1, wherein the signal combination further comprising channel state information-reference signal (CSI-RS).

5. A method, comprising:
    receiving, by a user equipment, configuration information that includes radio resource management (RRM) measurement type information and signal combination information having a corresponding index number for an RRM measurement, wherein the signal combination information indicates a signal combination of a primary synchronization signal (PSS), a secondary synchronization signal (SSS), and a broadcast channel (BCH) signal for the RRM measurement, wherein the RRM measurement includes at least one type of a reference signal received power (RSRP) measurement, a received signal strength indicator (RSSI) measurement, and a reference signal received quality (RSRQ) measurement, wherein there is at least one of a correspondence between the index number and the RRM measurement type information or a correspondence between the index number and the signal combination information; and
    performing, by the user equipment, the RRM measurement according to the configuration information.

6. The method according to claim 5, wherein the configuration information is used for RRM measurement for different cells.

7. The method according to claim 5, wherein the RRM measurement type information comprises at least one of a carrier type information, measurement item information, or measurement value adjustment parameter information, and wherein the measurement item information indicates the type of RRM measurement.

8. The method according to claim 5
    wherein the performing, by the user equipment, the RRM measurement according to the configuration information comprises searching, by the user equipment, a correspondence table according to the index number to:
        acquire the signal combination indicated by the index number; and
        perform the RRM measurement;
    wherein the correspondence table comprises a correspondence between the index number and the signal combination.

9. The method according to claim 5, wherein the signal combination further comprising channel state information-reference signal (CSI-RS).

10. An apparatus, comprising:
    a processor, configured to determine configuration information that includes radio resource management (RRM) measurement type information and signal combination information having a corresponding index number for an RRM measurement, wherein the signal combination information indicates a signal combination of a primary synchronization signal (PSS), a secondary synchronization signal (SSS), and a broadcast channel (BCH) signal for the RRM measurement, and wherein the RRM measurement includes at least one type of a reference signal received power (RSRP) measurement, a received signal strength indicator (RSSI) measurement, and a reference signal received quality (RSRQ) measurement, and wherein there is at least one of a correspondence between the index number and the RRM measurement type information or a correspondence between the index number and the signal combination information; and
    a transmitter, configured to send the configuration information that includes the RRM measurement type information and the signal combination information to a user equipment.

11. The apparatus according to claim 10, wherein the configuration information is used for RRM measurement for different cells.

12. The apparatus according to claim 10, wherein the RRM measurement type information comprises at least one of a carrier type information, measurement item information, or measurement value adjustment parameter information, and wherein the measurement item information indicates the type of the RRM measurement.

13. The apparatus according to claim 12, wherein the RRM measurement type information comprises the measurement value adjustment parameter information, the measurement value adjustment parameter information comprises weight values for measurement values that are respectively obtained from the RRM measurement using a signal different from each other in the signal combination, and the weight values are used for statistical averaging on the measurement values.

14. The apparatus according to claim 13, wherein the measurement value adjustment parameter information further comprises first adjustment values for the measurement values that are respectively obtained from the RRM measurement using a signal different from each other in the signal combination, and the first adjustment values are used to respectively adjust the measurement values before the statistical averaging on adjusted measurement values.

15. The apparatus according to claim 12, wherein the RRM measurement type information comprises the measurement value adjustment parameter information, the measurement value adjustment parameter information comprises a second adjustment value for a measurement value that is obtained from the RRM measurement using at least two signals in the signal combination, and the second adjustment value is used for adjusting the measurement value before comparing the measurement value with a threshold for the type of RRM measurement or another measurement value.

16. The apparatus according to claim 13, wherein a first measurement value obtained from the statistical averaging is used for calculating a second measurement value for another type of RRM measurement.

17. The apparatus according to claim 10, wherein the configuration information further comprises frequency domain location information and time domain location information of the PSS, SSS and BCH signal.

18. The apparatus according to claim 10, wherein the signal combination further comprising channel state information-reference signal (CSI-RS).

19. An apparatus, comprising:
  a receiver, configured to receive configuration information that includes radio resource management (RRM) measurement type information and signal combination information having a corresponding index number for an RRM measurement, wherein the signal combination information indicates a signal combination of a primary synchronization signal (PSS), a secondary synchronization signal (SSS), and a broadcast channel (BCH) signal for the RRM measurement sent from a base station, and wherein the RRM measurement includes at least one type of a reference signal received power (RSRP) measurement, a received signal strength indicator (RSSI) measurement, and a reference signal received quality (RSRQ) measurement, wherein there is at least one of a correspondence between the index number and the RRM measurement type information or a correspondence between the index number and the signal combination information; and
  a processor, configured to perform the RRM measurement according to the configuration information.

20. The apparatus according to claim 19, wherein the configuration information is used for RRM measurement for different cells.

21. The apparatus according to claim 19, wherein the RRM measurement type information comprises at least one of a carrier type information, measurement item information, or measurement value adjustment parameter information, and wherein the measurement item information indicates the type of the RRM measurement.

22. The apparatus according to claim 21, wherein the RRM measurement type information comprises the measurement value adjustment parameter information, the measurement value adjustment parameter information comprises weight values for measurement values that are respectively obtained from the RRM measurement using a signal different from each other in the signal combination, and the weight values are used for statistical averaging on the measurement values.

23. The apparatus according to claim 21, wherein the measurement value adjustment parameter information further comprises first adjustment values for the measurement values that are respectively obtained from the RRM measurement using a signal different from each other in the signal combination, and the first adjustment values are used to respectively adjust the measurement values before the statistical averaging on adjusted measurement values.

24. The apparatus according to claim 21, wherein the RRM measurement type information comprises the measurement value adjustment parameter information, the measurement value adjustment parameter information comprises a second adjustment value for a measurement value that is obtained from the RRM measurement using at least two signals in the signal combination, and the second adjustment value is used for adjusting the measurement value before comparing the measurement value with a threshold for the type of RRM measurement or another measurement value.

25. The apparatus according to claim 22, wherein a first measurement value obtained from the statistical averaging is used for calculating a second measurement value for another type of RRM measurement.

26. The apparatus according to claim 19, wherein the processor is further configured to search a correspondence table according to the index number to:
  acquire the signal combination indicated by the index number; and
  perform the RRM measurement;
  wherein the correspondence table comprises a correspondence between the index number and the signal combination.

27. The apparatus according to claim 19, wherein the configuration information further comprises frequency domain location information and time domain location information of the PSS, SSS and BCH signal.

28. The method according to claim 19, wherein the signal combination further comprising channel state information-reference signal (CSI-RS).

* * * * *